US011776229B2

(12) United States Patent
Holzer et al.

(10) Patent No.: US 11,776,229 B2
(45) Date of Patent: Oct. 3, 2023

(54) MODIFICATION OF MULTI-VIEW INTERACTIVE DIGITAL MEDIA REPRESENTATION

(71) Applicant: Fyusion, Inc., San Francisco, CA (US)

(72) Inventors: Stefan Johannes Josef Holzer, San Mateo, CA (US); Stephen David Miller, Menlo Park, CA (US); Pantelis Kalogiros, San Francisco, CA (US); George Haber, Los Altos Hills, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 16 days.

(21) Appl. No.: 17/352,654

(22) Filed: Jun. 21, 2021

(65) Prior Publication Data

US 2021/0312719 A1   Oct. 7, 2021

Related U.S. Application Data

(63) Continuation of application No. 15/632,709, filed on Jun. 26, 2017, now Pat. No. 11,069,147.

(51) Int. Cl.
*G06T 19/20* (2011.01)
*H04N 23/698* (2023.01)
*H04N 13/156* (2018.01)

(52) U.S. Cl.
CPC ........... *G06T 19/20* (2013.01); *H04N 13/156* (2018.05); *H04N 23/698* (2023.01)

(58) Field of Classification Search
CPC ... G06T 19/20; G06T 19/006; H04N 5/23238; H04N 13/156
See application file for complete search history.

(56) References Cited

U.S. PATENT DOCUMENTS 2,534,821 A   12/1950   Ifield
5,495,576 A   2/1996   Ritchey
(Continued)

FOREIGN PATENT DOCUMENTS

CN   105849781 A   8/2016
CN   105849781 B   8/2016
(Continued)

OTHER PUBLICATIONS

U.S. Appl. No. 14/800,640, Advisory Action dated Feb. 8, 2018, 2 pgs.

(Continued)

*Primary Examiner* — Chante E Harrison
(74) *Attorney, Agent, or Firm* — Kwan & Olynick LLP

(57) ABSTRACT

Provided are mechanisms and processes for inserting a visual element into a multi-view digital media representation (MVIDMR). In one example, a process includes analyzing an MVIDMR to determine if there is an appropriate location to insert a visual element. Once a location is found, the type of visual element appropriate for the location is determined, where the type of visual element includes either a three-dimensional object to be inserted in the MVIDMR or a two-dimensional image to be inserted as or projected onto a background or object in the MVIDMR. A visual element that is appropriate for the location is then retrieved and inserted into the MVIDMR, such that the visual element is integrated into the MVIDMR and navigable by a user.

19 Claims, 9 Drawing Sheets

(56) References Cited

U.S. PATENT DOCUMENTS

| | | |
|---|---|---|
| 5,557,684 A | 9/1996 | Wang |
| 5,613,048 A | 3/1997 | Chen |
| 5,613,056 A | 3/1997 | Gasper |
| 5,694,533 A | 12/1997 | Richards |
| 5,706,417 A | 1/1998 | Adelson |
| 5,847,714 A | 12/1998 | Naqvi |
| 5,850,352 A | 12/1998 | Moezzi |
| 5,926,190 A | 7/1999 | Turkowski |
| 6,031,564 A | 2/2000 | Ma |
| 6,080,063 A | 6/2000 | Khosla |
| 6,185,343 B1 | 2/2001 | Ikeda |
| 6,252,974 B1 | 6/2001 | Martens |
| 6,266,068 B1 | 7/2001 | Kang |
| 6,281,903 B1 | 8/2001 | Martin |
| 6,327,381 B1 | 12/2001 | Rogina |
| 6,385,245 B1 | 5/2002 | De Haan |
| 6,504,569 B1 | 1/2003 | Jasinschi |
| 6,522,787 B1 | 2/2003 | Kumar |
| 6,778,207 B1 | 8/2004 | Lee |
| 6,814,889 B1 | 11/2004 | O'Grady |
| 6,975,756 B1 | 12/2005 | Slabaugh |
| 7,167,180 B1 | 1/2007 | Shibolet |
| 7,593,000 B1 | 9/2009 | Chin |
| 7,631,261 B2 | 12/2009 | Williams |
| 7,631,277 B1 | 12/2009 | Nie |
| 8,078,004 B2 | 12/2011 | Kang |
| 8,094,928 B2 | 1/2012 | Graepel |
| 8,160,391 B1 | 4/2012 | Zhu |
| 8,244,069 B1 | 8/2012 | Bourdev |
| 8,401,276 B1 | 3/2013 | Choe |
| 8,503,826 B2 | 8/2013 | Klimenko |
| 8,504,842 B1 | 8/2013 | Meacham |
| 8,515,982 B1 | 8/2013 | Hickman |
| 8,589,069 B1 | 11/2013 | Lehman |
| 8,682,097 B2 | 3/2014 | Steinberg |
| 8,803,912 B1 | 8/2014 | Fouts |
| 8,817,071 B2 | 8/2014 | Wang |
| 8,819,525 B1 | 8/2014 | Holmer |
| 8,866,841 B1 | 10/2014 | Distler |
| 8,942,917 B2 | 1/2015 | Chrysanthakopoulos |
| 8,947,452 B1 | 2/2015 | Ballagh |
| 8,947,455 B2 | 2/2015 | Friesen |
| 8,963,855 B2 | 2/2015 | Chen |
| 8,966,356 B1 | 2/2015 | Hickman |
| 9,024,970 B2 | 5/2015 | Lynch |
| 9,027,117 B2 | 5/2015 | Wilairat |
| 9,043,222 B1 | 5/2015 | Kerr |
| 9,070,402 B2 | 6/2015 | Burtnyk et al. |
| 9,094,670 B1 | 7/2015 | Furio |
| 9,129,179 B1 | 9/2015 | Wong |
| 9,317,881 B1 | 4/2016 | Ledterman |
| 9,325,899 B1 | 4/2016 | Chou |
| 9,367,951 B1 | 6/2016 | Gray |
| 9,390,250 B2 | 7/2016 | Kim |
| 9,400,595 B2 | 7/2016 | Li |
| 9,407,816 B1 | 8/2016 | Sehn |
| 9,412,203 B1 | 8/2016 | Garcia, III |
| 9,472,161 B1 | 10/2016 | Ho et al. |
| 9,621,768 B1 | 4/2017 | Lyon |
| 9,704,257 B1 | 7/2017 | Tuzel |
| 9,734,586 B2 | 8/2017 | Luo |
| 9,865,033 B1 | 1/2018 | Jafarzadeh |
| 9,865,058 B2 | 1/2018 | Mullins |
| 9,865,069 B1 | 1/2018 | Saporta |
| 9,886,771 B1 | 2/2018 | Chen |
| 9,898,742 B2 | 2/2018 | Higgins |
| 9,904,056 B2 | 2/2018 | Raghoebardajal |
| 9,910,505 B2 | 3/2018 | Park |
| 9,928,544 B1 | 3/2018 | Hasan |
| 9,940,541 B2 | 4/2018 | Holzer |
| 9,968,257 B1 | 5/2018 | Burt |
| 9,998,663 B1 | 6/2018 | François |
| 10,055,882 B2 | 8/2018 | Marin |
| 10,147,211 B2 | 12/2018 | Holzer |
| 10,157,333 B1 | 12/2018 | Wang |
| 10,176,592 B2 | 1/2019 | Holzer |
| 10,176,636 B1 | 1/2019 | Neustein et al. |
| 10,204,448 B2 | 2/2019 | Hazeghi |
| 10,222,932 B2 | 3/2019 | Holzer |
| 10,242,474 B2 | 3/2019 | Holzer |
| 10,262,426 B2 | 4/2019 | Holzer |
| 10,275,935 B2 | 4/2019 | Holzer |
| 10,284,794 B1 * | 5/2019 | Francois ............... H04N 5/3415 |
| 10,306,203 B1 | 5/2019 | Goyal |
| 10,360,601 B1 | 7/2019 | Adegan |
| 10,373,260 B1 | 8/2019 | Haller, Jr. |
| 10,382,739 B1 | 8/2019 | Rusu |
| 10,430,995 B2 | 10/2019 | Holzer |
| 10,574,974 B2 | 2/2020 | Arora et al. |
| 10,657,647 B1 | 5/2020 | Chen |
| 10,668,965 B2 | 6/2020 | Czinger |
| 10,719,939 B2 | 7/2020 | Holzer |
| 10,725,609 B2 | 7/2020 | Holzer |
| 10,726,560 B2 | 7/2020 | Holzer |
| 10,748,313 B2 | 8/2020 | Holzer et al. |
| 10,750,161 B2 | 8/2020 | Holzer |
| 10,818,029 B2 | 10/2020 | Holzer |
| 10,846,913 B2 | 11/2020 | Holzer |
| 10,852,902 B2 | 12/2020 | Holzer |
| 11,006,095 B2 | 5/2021 | Holzer |
| 11,055,534 B2 | 7/2021 | Beall |
| 2001/0014172 A1 | 8/2001 | Baba |
| 2002/0024517 A1 | 2/2002 | Yamaguchi |
| 2002/0094125 A1 | 7/2002 | Guo |
| 2002/0190991 A1 | 12/2002 | Efran |
| 2003/0086002 A1 | 5/2003 | Cahill |
| 2003/0185456 A1 | 10/2003 | Sato |
| 2003/0231179 A1 | 12/2003 | Suzuki |
| 2004/0085335 A1 | 5/2004 | Burlnyk et al. |
| 2004/0104935 A1 | 6/2004 | Williamson |
| 2004/0141014 A1 | 7/2004 | Kamiwada |
| 2004/0184013 A1 | 9/2004 | Raskar |
| 2004/0222987 A1 | 11/2004 | Chang |
| 2004/0239699 A1 | 12/2004 | Uyttendaele |
| 2005/0018045 A1 | 1/2005 | Thomas |
| 2005/0041842 A1 | 2/2005 | Frakes |
| 2005/0046645 A1 | 3/2005 | Breton et al. |
| 2005/0119550 A1 | 6/2005 | Serra |
| 2005/0151759 A1 | 7/2005 | Gonzalez-Banos |
| 2005/0186548 A1 | 8/2005 | Tomlinson |
| 2005/0219264 A1 | 10/2005 | Shum |
| 2005/0226502 A1 | 10/2005 | Cohen |
| 2005/0232467 A1 | 10/2005 | Mohri |
| 2005/0232510 A1 | 10/2005 | Blake |
| 2005/0253877 A1 | 11/2005 | Thompson |
| 2005/0283075 A1 | 12/2005 | Ma |
| 2005/0285874 A1 | 12/2005 | Zitnick, III |
| 2006/0028552 A1 | 2/2006 | Aggarwal |
| 2006/0188147 A1 | 8/2006 | Rai |
| 2006/0193535 A1 | 8/2006 | Mishima |
| 2006/0250505 A1 | 11/2006 | Gennetten |
| 2006/0256109 A1 | 11/2006 | Acker |
| 2007/0008312 A1 | 1/2007 | Zhou |
| 2007/0058880 A1 | 3/2007 | Lienard |
| 2007/0064802 A1 | 3/2007 | Paniconi |
| 2007/0070069 A1 | 3/2007 | Samarasekera |
| 2007/0110338 A1 | 5/2007 | Snavely |
| 2007/0118801 A1 | 5/2007 | Harshbarger |
| 2007/0126928 A1 | 6/2007 | Klompnhouwer |
| 2007/0159487 A1 | 7/2007 | Felt |
| 2007/0237420 A1 | 10/2007 | Steedly |
| 2007/0237422 A1 | 10/2007 | Zhou |
| 2007/0252804 A1 | 11/2007 | Engel |
| 2007/0269054 A1 | 11/2007 | Takagi |
| 2008/0025588 A1 | 1/2008 | Zhang |
| 2008/0033641 A1 | 2/2008 | Medalia |
| 2008/0106593 A1 | 5/2008 | Arfvidsson |
| 2008/0151106 A1 | 6/2008 | Verburgh |
| 2008/0152258 A1 | 6/2008 | Tulkki |
| 2008/0198159 A1 | 8/2008 | Liu |
| 2008/0201734 A1 | 8/2008 | Lyon |
| 2008/0225132 A1 | 9/2008 | Inaguma |
| 2008/0246759 A1 | 10/2008 | Summers |
| 2008/0266142 A1 | 10/2008 | Sula |

(56) References Cited

U.S. PATENT DOCUMENTS

| | | |
|---|---|---|
| 2008/0278569 A1 | 11/2008 | Rotem |
| 2008/0313014 A1 | 12/2008 | Fell |
| 2009/0003725 A1 | 1/2009 | Merkel |
| 2009/0046160 A1 | 2/2009 | Hayashi |
| 2009/0077161 A1 | 3/2009 | Hamilton, II |
| 2009/0087029 A1 | 4/2009 | Coleman |
| 2009/0116732 A1 | 5/2009 | Zhou |
| 2009/0141130 A1 | 6/2009 | Ortiz |
| 2009/0144173 A1 | 6/2009 | Mo |
| 2009/0153549 A1 | 6/2009 | Lynch |
| 2009/0160934 A1 | 6/2009 | Hendrickson |
| 2009/0163185 A1 | 6/2009 | Lim |
| 2009/0174709 A1 | 7/2009 | Kozlak |
| 2009/0208062 A1 | 8/2009 | Sorek |
| 2009/0262074 A1 | 10/2009 | Nasiri |
| 2009/0263045 A1 | 10/2009 | Szeliski |
| 2009/0274391 A1 | 11/2009 | Arcas |
| 2009/0276805 A1 | 11/2009 | Andrews, II |
| 2009/0303343 A1 | 12/2009 | Drimbarean |
| 2010/0007715 A1 | 1/2010 | Lai |
| 2010/0017181 A1 | 1/2010 | Mouton |
| 2010/0026788 A1 | 2/2010 | Ishikawa |
| 2010/0033553 A1 | 2/2010 | Levy |
| 2010/0060793 A1 | 3/2010 | Oz |
| 2010/0079667 A1 | 4/2010 | Tueretken |
| 2010/0098258 A1 | 4/2010 | Thorn |
| 2010/0100492 A1 | 4/2010 | Law |
| 2010/0110069 A1 | 5/2010 | Yuan |
| 2010/0111444 A1 | 5/2010 | Coffman |
| 2010/0164990 A1 | 7/2010 | Doorn |
| 2010/0171691 A1 | 7/2010 | Cook |
| 2010/0188584 A1 | 7/2010 | Liu |
| 2010/0215251 A1 | 8/2010 | Klein Gunnewiek |
| 2010/0225743 A1 | 9/2010 | Florencio |
| 2010/0231593 A1 | 9/2010 | Zhou |
| 2010/0259595 A1 | 10/2010 | Trimeche |
| 2010/0266172 A1 | 10/2010 | Shlomi |
| 2010/0305857 A1 | 12/2010 | Byrne |
| 2010/0315412 A1 | 12/2010 | Sinha |
| 2010/0329542 A1 | 12/2010 | Ramalingam |
| 2011/0007072 A1 | 1/2011 | Khan |
| 2011/0033170 A1 | 2/2011 | Ikeda |
| 2011/0034103 A1 | 2/2011 | Fong |
| 2011/0040539 A1 | 2/2011 | Szymczyk |
| 2011/0043604 A1 | 2/2011 | Peleg |
| 2011/0064388 A1 | 3/2011 | Brown |
| 2011/0074926 A1 | 3/2011 | Khan |
| 2011/0090344 A1 | 4/2011 | Gefen |
| 2011/0105192 A1 | 5/2011 | Jung |
| 2011/0109618 A1 | 5/2011 | Nowak |
| 2011/0109726 A1 | 5/2011 | Hwang |
| 2011/0115886 A1 | 5/2011 | Nguyen |
| 2011/0141227 A1 | 6/2011 | Bigioi |
| 2011/0142289 A1 | 6/2011 | Barenbrug |
| 2011/0142343 A1 | 6/2011 | Kim |
| 2011/0170789 A1 | 7/2011 | Amon |
| 2011/0173565 A1 | 7/2011 | Ofek |
| 2011/0179373 A1 | 7/2011 | Moore |
| 2011/0193941 A1 | 8/2011 | Inaba |
| 2011/0141141 A1 | 9/2011 | Kankainen |
| 2011/0214072 A1 | 9/2011 | Lindemann |
| 2011/0234750 A1 | 9/2011 | Lai |
| 2011/0248987 A1 | 10/2011 | Mitchell |
| 2011/0254835 A1 | 10/2011 | Segal |
| 2011/0261050 A1 | 10/2011 | Smolic |
| 2011/0288858 A1 | 11/2011 | Gay |
| 2011/0313653 A1 | 12/2011 | Lindner |
| 2011/0316963 A1 | 12/2011 | Li |
| 2012/0007713 A1 | 1/2012 | Nasiri |
| 2012/0013711 A1 | 1/2012 | Tamir |
| 2012/0017147 A1 | 1/2012 | Mark |
| 2012/0019557 A1 | 1/2012 | Aronsson |
| 2012/0028706 A1 | 2/2012 | Raitt |
| 2012/0041722 A1 | 2/2012 | Quan |
| 2012/0057006 A1 | 3/2012 | Joseph |
| 2012/0062756 A1 | 3/2012 | Tian |
| 2012/0075411 A1 | 3/2012 | Matsumoto |
| 2012/0092348 A1 | 4/2012 | McCutchen |
| 2012/0095323 A1 | 4/2012 | Eskandari |
| 2012/0099804 A1 | 4/2012 | Aguilera |
| 2012/0127172 A1 | 5/2012 | Wu |
| 2012/0127270 A1 | 5/2012 | Zhang |
| 2012/0139918 A1 | 6/2012 | Michail |
| 2012/0147224 A1 | 6/2012 | Takayama |
| 2012/0148162 A1 | 6/2012 | Zhang |
| 2012/0162223 A1 | 6/2012 | Hirai |
| 2012/0162253 A1 | 6/2012 | Collins |
| 2012/0167146 A1 | 6/2012 | Incorvia |
| 2012/0198317 A1 | 8/2012 | Eppolito |
| 2012/0207308 A1 | 8/2012 | Sung |
| 2012/0212579 A1 | 8/2012 | Frojdh |
| 2012/0236201 A1 | 9/2012 | Larsen |
| 2012/0240035 A1 | 9/2012 | Gaucas |
| 2012/0242798 A1 | 9/2012 | McArdle |
| 2012/0257025 A1 | 10/2012 | Kim |
| 2012/0257065 A1 | 10/2012 | Velarde |
| 2012/0258436 A1 | 10/2012 | Lee |
| 2012/0262580 A1 | 10/2012 | Huebner |
| 2012/0287123 A1 | 11/2012 | Starner |
| 2012/0293632 A1 | 11/2012 | Yukich |
| 2012/0294549 A1 | 11/2012 | Doepke |
| 2012/0300019 A1 | 11/2012 | Yang et al. |
| 2012/0301044 A1 | 11/2012 | Nakada |
| 2012/0314027 A1 | 12/2012 | Tian |
| 2012/0314040 A1 | 12/2012 | Kopf |
| 2012/0314899 A1 | 12/2012 | Cohen |
| 2013/0002649 A1 | 1/2013 | Wu |
| 2013/0016102 A1 | 1/2013 | Look |
| 2013/0016897 A1 | 1/2013 | Cho |
| 2013/0018881 A1 | 1/2013 | Bhatt |
| 2013/0044191 A1 | 2/2013 | Matsumoto |
| 2013/0050573 A1 | 2/2013 | Syed |
| 2013/0057644 A1 | 3/2013 | Stefanoski |
| 2013/0063549 A1 | 3/2013 | Schnyder |
| 2013/0071012 A1 | 3/2013 | Leichsenring |
| 2013/0076619 A1 | 3/2013 | Carr |
| 2013/0113830 A1 | 5/2013 | Suzuki |
| 2013/0120581 A1 | 5/2013 | Daniels |
| 2013/0127844 A1 | 5/2013 | Koeppel |
| 2013/0127847 A1 | 5/2013 | Jin |
| 2013/0129304 A1 | 5/2013 | Feinson |
| 2013/0141530 A1 | 6/2013 | Zavesky |
| 2013/0147795 A1 | 6/2013 | Kim |
| 2013/0147905 A1 | 6/2013 | Vivekanandan |
| 2013/0154926 A1 | 6/2013 | Kim |
| 2013/0155180 A1 | 6/2013 | Wantland |
| 2013/0162634 A1 | 6/2013 | Baik |
| 2013/0162787 A1 | 6/2013 | Cho |
| 2013/0176392 A1 | 7/2013 | Carr |
| 2013/0195350 A1 | 8/2013 | Tanaka |
| 2013/0204411 A1 | 8/2013 | Clark |
| 2013/0208900 A1 | 8/2013 | Vincent |
| 2013/0212538 A1 | 8/2013 | Lemire |
| 2013/0219357 A1 | 8/2013 | Reitan |
| 2013/0240628 A1 | 9/2013 | Van Der Merwe |
| 2013/0250045 A1 | 9/2013 | Ki |
| 2013/0271566 A1 | 10/2013 | Chen |
| 2013/0278596 A1 | 10/2013 | Wu |
| 2013/0314442 A1 | 11/2013 | Langlotz |
| 2014/0002440 A1 | 1/2014 | Lynch |
| 2014/0002472 A1 | 1/2014 | Sobeski et al. |
| 2014/0009462 A1 | 1/2014 | McNamer |
| 2014/0013414 A1 | 1/2014 | Bruck |
| 2014/0023341 A1 | 1/2014 | Wang |
| 2014/0037198 A1 | 2/2014 | Larlus-Larrondo |
| 2014/0040742 A1 | 2/2014 | Park |
| 2014/0049607 A1 | 2/2014 | Amon |
| 2014/0059674 A1 | 2/2014 | Sun |
| 2014/0063005 A1 | 3/2014 | Ahn |
| 2014/0078136 A1 | 3/2014 | Sohn |
| 2014/0087877 A1 | 3/2014 | Krishnan |
| 2014/0092259 A1 | 4/2014 | Tsang |
| 2014/0100995 A1 | 4/2014 | Koshy et al. |
| 2014/0107888 A1 | 4/2014 | Quast |

(56) References Cited

U.S. PATENT DOCUMENTS

| | | |
|---|---|---|
| 2014/0118479 A1 | 5/2014 | Rapoport |
| 2014/0118483 A1 | 5/2014 | Rapoport |
| 2014/0118494 A1 | 5/2014 | Wu |
| 2014/0125659 A1 | 5/2014 | Yoshida |
| 2014/0132594 A1 | 5/2014 | Gharpure |
| 2014/0152834 A1 | 6/2014 | Kosseifi |
| 2014/0153832 A1 | 6/2014 | Kwatra |
| 2014/0177927 A1 | 6/2014 | Shieh |
| 2014/0192155 A1 | 7/2014 | Choi |
| 2014/0198184 A1 | 7/2014 | Stein |
| 2014/0199050 A1 | 7/2014 | Khalsa |
| 2014/0211989 A1 | 7/2014 | Ding |
| 2014/0225930 A1 | 8/2014 | Durmek |
| 2014/0232634 A1 | 8/2014 | Piemonte |
| 2014/0253436 A1 | 9/2014 | Petersen |
| 2014/0253746 A1 | 9/2014 | Voss |
| 2014/0267616 A1 | 9/2014 | Krig |
| 2014/0275704 A1 | 9/2014 | Zhang |
| 2014/0286566 A1 | 9/2014 | Rhoads |
| 2014/0293004 A1 | 10/2014 | Tsubaki |
| 2014/0293028 A1 | 10/2014 | Nguyen |
| 2014/0297798 A1 | 10/2014 | Bakalash |
| 2014/0307045 A1 | 10/2014 | Richardt |
| 2014/0340404 A1 | 11/2014 | Wang |
| 2014/0362198 A1 | 12/2014 | Nakayama |
| 2014/0365888 A1 | 12/2014 | Curzon |
| 2014/0375684 A1 | 12/2014 | Algreatly |
| 2015/0009130 A1 | 1/2015 | Motta |
| 2015/0010218 A1 | 1/2015 | Bayer |
| 2015/0016714 A1 | 1/2015 | Chui |
| 2015/0042812 A1 | 2/2015 | Tang |
| 2015/0046875 A1 | 2/2015 | Xu |
| 2015/0073570 A1 | 3/2015 | Gonzalez-Mendoza |
| 2015/0078449 A1 | 3/2015 | Diggins |
| 2015/0097961 A1 | 4/2015 | Ure |
| 2015/0103170 A1 | 4/2015 | Nelson |
| 2015/0103197 A1 | 4/2015 | Djordjevic et al. |
| 2015/0130799 A1 | 5/2015 | Holzer |
| 2015/0130800 A1 | 5/2015 | Holzer |
| 2015/0130894 A1 | 5/2015 | Holzer |
| 2015/0134651 A1 | 5/2015 | Holzer |
| 2015/0138190 A1 | 5/2015 | Holzer |
| 2015/0143239 A1 | 5/2015 | Birkbeck |
| 2015/0154442 A1 | 6/2015 | Takahashi |
| 2015/0188967 A1 | 7/2015 | Paulauskas |
| 2015/0193963 A1 | 7/2015 | Chen |
| 2015/0198443 A1 | 7/2015 | Yi |
| 2015/0201176 A1 | 7/2015 | Graziosi |
| 2015/0206341 A1 | 7/2015 | Loper |
| 2015/0222880 A1 | 8/2015 | Choi |
| 2015/0227285 A1 | 8/2015 | Lee |
| 2015/0227816 A1 | 8/2015 | Du |
| 2015/0235408 A1 | 8/2015 | Gross |
| 2015/0242686 A1 | 8/2015 | Lenka |
| 2015/0254224 A1 | 9/2015 | Kim |
| 2015/0269772 A1 | 9/2015 | Ha |
| 2015/0271356 A1 | 9/2015 | Terada |
| 2015/0281323 A1 | 10/2015 | Gold |
| 2015/0294492 A1 | 10/2015 | Koch |
| 2015/0309695 A1 | 10/2015 | Sannandeji |
| 2015/0318020 A1 | 11/2015 | Pribula |
| 2015/0319424 A1 | 11/2015 | Haimovitch-Yogev |
| 2015/0324649 A1 | 11/2015 | Grewe |
| 2015/0339846 A1 | 11/2015 | Holzer |
| 2015/0371440 A1 | 12/2015 | Pirchheim |
| 2015/0379763 A1 | 12/2015 | Liktor |
| 2016/0001137 A1 | 1/2016 | Phillips |
| 2016/0026253 A1 | 1/2016 | Bradski |
| 2016/0027209 A1 | 1/2016 | Demirli |
| 2016/0034459 A1 | 2/2016 | Larsen |
| 2016/0042251 A1 | 2/2016 | Cordova-Diba |
| 2016/0044240 A1 | 2/2016 | Beers |
| 2016/0050368 A1 | 2/2016 | Seo |
| 2016/0055330 A1 | 2/2016 | Morishita |
| 2016/0061582 A1 | 3/2016 | Lucey |
| 2016/0063740 A1 | 3/2016 | Sakimoto |
| 2016/0077422 A1 | 3/2016 | Wang |
| 2016/0078287 A1 | 3/2016 | Auge |
| 2016/0080684 A1 | 3/2016 | Farrell |
| 2016/0080830 A1 | 3/2016 | Kim |
| 2016/0086381 A1 | 3/2016 | Jung |
| 2016/0088287 A1 | 3/2016 | Sadi |
| 2016/0110913 A1 | 4/2016 | Kosoy |
| 2016/0139794 A1 | 5/2016 | Hammendorp |
| 2016/0140125 A1 | 5/2016 | Goyal |
| 2016/0171330 A1 | 6/2016 | Mentese |
| 2016/0189334 A1 | 6/2016 | Mason |
| 2016/0191895 A1 | 6/2016 | Yun |
| 2016/0203586 A1 | 7/2016 | Chang |
| 2016/0205341 A1 | 7/2016 | Hollander |
| 2016/0210602 A1 | 7/2016 | Siddique et al. |
| 2016/0261855 A1 | 9/2016 | Park |
| 2016/0267676 A1 | 9/2016 | Setomoto |
| 2016/0275283 A1 | 9/2016 | De Leon |
| 2016/0295127 A1 | 10/2016 | Yu |
| 2016/0350930 A1 | 12/2016 | Lin |
| 2016/0350975 A1 | 12/2016 | Nakagawa |
| 2016/0353089 A1 | 12/2016 | Gallup |
| 2016/0358337 A1 | 12/2016 | Dai |
| 2016/0379415 A1 | 12/2016 | Espeset |
| 2017/0018054 A1 | 1/2017 | Holzer |
| 2017/0018055 A1 | 1/2017 | Holzer |
| 2017/0018056 A1 | 1/2017 | Holzer |
| 2017/0024094 A1 | 1/2017 | Gresham |
| 2017/0026574 A1 | 1/2017 | Kwon |
| 2017/0053169 A1 | 2/2017 | Cuban |
| 2017/0067739 A1 | 3/2017 | Siercks |
| 2017/0084001 A1 | 3/2017 | Holzer |
| 2017/0084293 A1 | 3/2017 | Holzer et al. |
| 2017/0087415 A1 | 3/2017 | Nandimandalam |
| 2017/0103510 A1 | 4/2017 | Wang |
| 2017/0103584 A1 | 4/2017 | Vats |
| 2017/0109930 A1 | 4/2017 | Holzer et al. |
| 2017/0124769 A1 | 5/2017 | Saito |
| 2017/0124770 A1 | 5/2017 | Vats |
| 2017/0126988 A1 | 5/2017 | Holzer |
| 2017/0140236 A1 | 5/2017 | Price |
| 2017/0148179 A1 | 5/2017 | Holzer |
| 2017/0148186 A1 | 5/2017 | Holzer |
| 2017/0148199 A1 | 5/2017 | Holzer |
| 2017/0148222 A1 | 5/2017 | Holzer |
| 2017/0148223 A1 | 5/2017 | Holzer |
| 2017/0158131 A1 | 6/2017 | Friebe |
| 2017/0206648 A1 | 7/2017 | Marra |
| 2017/0213385 A1 | 7/2017 | Yu |
| 2017/0231550 A1 | 8/2017 | Do |
| 2017/0236287 A1 | 8/2017 | Shen |
| 2017/0249339 A1 | 8/2017 | Lester |
| 2017/0255648 A1 | 9/2017 | Dube |
| 2017/0256066 A1 | 9/2017 | Richard |
| 2017/0277363 A1 | 9/2017 | Holzer |
| 2017/0277952 A1 | 9/2017 | Thommes |
| 2017/0278544 A1 | 9/2017 | Choi |
| 2017/0287137 A1 | 10/2017 | Lin |
| 2017/0293894 A1 | 10/2017 | Taliwal |
| 2017/0308771 A1 | 10/2017 | Shimauchi |
| 2017/0316092 A1 | 11/2017 | Fichter |
| 2017/0330319 A1 | 11/2017 | Xu |
| 2017/0337693 A1 | 11/2017 | Baruch |
| 2017/0344223 A1 | 11/2017 | Holzer et al. |
| 2017/0344808 A1 | 11/2017 | El-Khamy |
| 2017/0357910 A1 | 12/2017 | Sommer |
| 2017/0359570 A1 | 12/2017 | Holzer |
| 2017/0364766 A1 | 12/2017 | Das |
| 2018/0012330 A1 | 1/2018 | Holzer |
| 2018/0012529 A1 | 1/2018 | Chiba |
| 2018/0035105 A1 | 2/2018 | Choi |
| 2018/0035500 A1 | 2/2018 | Song |
| 2018/0045592 A1 | 2/2018 | Okita |
| 2018/0046356 A1 | 2/2018 | Holzer |
| 2018/0046357 A1 | 2/2018 | Holzer et al. |
| 2018/0046649 A1 | 2/2018 | Dal Mutto |
| 2018/0052665 A1 | 2/2018 | Kaur |
| 2018/0063504 A1 | 3/2018 | Haines |

(56) References Cited

U.S. PATENT DOCUMENTS

| | | | |
|---|---|---|---|
| 2018/0082715 A1 | 3/2018 | Rymkowski | |
| 2018/0143023 A1 | 5/2018 | Bjorke et al. | |
| 2018/0143756 A1 | 5/2018 | Mildrew et al. | |
| 2018/0144547 A1 | 5/2018 | Shakib | |
| 2018/0155057 A1 | 6/2018 | Irish | |
| 2018/0158197 A1 | 6/2018 | Dasgupta | |
| 2018/0165875 A1 | 6/2018 | Yu | |
| 2018/0199025 A1 | 7/2018 | Holzer | |
| 2018/0203877 A1 | 7/2018 | Holzer | |
| 2018/0205941 A1 | 7/2018 | Kopf | |
| 2018/0211131 A1 | 7/2018 | Holzer | |
| 2018/0211404 A1 | 7/2018 | Zhu et al. | |
| 2018/0218235 A1 | 8/2018 | Holzer | |
| 2018/0218236 A1 | 8/2018 | Holzer | |
| 2018/0234671 A1 | 8/2018 | Yang | |
| 2018/0240243 A1 | 8/2018 | Kim | |
| 2018/0255290 A1 | 9/2018 | Holzer | |
| 2018/0268220 A1 | 9/2018 | Lee | |
| 2018/0286098 A1 | 10/2018 | Lorenzo | |
| 2018/0293774 A1 | 10/2018 | Yu | |
| 2018/0315200 A1 | 11/2018 | Davydov | |
| 2018/0336724 A1 | 11/2018 | Spring | |
| 2018/0336737 A1 | 11/2018 | Varady | |
| 2018/0338126 A1 | 11/2018 | Trevor | |
| 2018/0338128 A1 | 11/2018 | Trevor | |
| 2018/0357518 A1 | 12/2018 | Sekii | |
| 2018/0374273 A1 | 12/2018 | Holzer et al. | |
| 2019/0019056 A1 | 1/2019 | Pierce | |
| 2019/0025544 A1 | 1/2019 | Watanabe | |
| 2019/0026956 A1 | 1/2019 | Gausebeck et al. | |
| 2019/0026958 A1* | 1/2019 | Gausebeck | H04N 13/10 |
| 2019/0035149 A1 | 1/2019 | Chen | |
| 2019/0050664 A1 | 2/2019 | Yang | |
| 2019/0080499 A1 | 3/2019 | Holzer | |
| 2019/0094981 A1 | 3/2019 | Bradski et al. | |
| 2019/0147221 A1 | 5/2019 | Grabner | |
| 2019/0209886 A1 | 7/2019 | Harlow | |
| 2019/0213392 A1 | 7/2019 | Pan | |
| 2019/0213406 A1 | 7/2019 | Porikli | |
| 2019/0220991 A1 | 7/2019 | Holzer | |
| 2019/0221021 A1 | 7/2019 | Holzer | |
| 2019/0222776 A1 | 7/2019 | Carter | |
| 2019/0235729 A1 | 8/2019 | Day | |
| 2019/0244372 A1 | 8/2019 | Holzer | |
| 2019/0251738 A1 | 8/2019 | Holzer | |
| 2019/0278434 A1 | 9/2019 | Holzer | |
| 2019/0304064 A1 | 10/2019 | Zhang | |
| 2019/0364265 A1 | 11/2019 | Matsunobu et al. | |
| 2020/0027263 A1 | 1/2020 | Holzer | |
| 2020/0045249 A1 | 2/2020 | Francois | |
| 2020/0125877 A1 | 4/2020 | Phan | |
| 2020/0128060 A1 | 4/2020 | Han | |
| 2020/0137380 A1 | 4/2020 | Supikov | |
| 2020/0167570 A1 | 5/2020 | Beall | |
| 2020/0234397 A1 | 7/2020 | Holzer et al. | |
| 2020/0234451 A1 | 7/2020 | Holzer et al. | |

FOREIGN PATENT DOCUMENTS

| | | | | |
|---|---|---|---|---|
| CN | 107466474 A | * | 12/2017 | G02B 27/017 |
| DE | 112014005165 | | 7/2016 | |
| DE | 112017004150 | | 6/2019 | |
| GB | 2534821 A | | 8/2016 | |
| KR | 20120110861 | | 10/2012 | |
| KR | 101590256 B1 | | 2/2016 | |
| WO | 2015073570 A2 | | 5/2015 | |
| WO | 2017053197 A1 | | 3/2017 | |
| WO | 2018035500 A1 | | 2/2018 | |
| WO | 2018052665 A1 | | 3/2018 | |
| WO | 2018154331 A1 | | 8/2018 | |
| WO | 2019209886 | | 10/2019 | |
| WO | 2020092177 A2 | | 5/2020 | |

OTHER PUBLICATIONS

U.S. Appl. No. 14/800,640, Examiner Interview Summary dated Feb. 8, 2018, 1 pg.

U.S. Appl. No. 14/800,640, Examiner Interview Summary dated Oct. 23, 2018, 3 pgs.

U.S. Appl. No. 14/800,640, Final Office Action dated Oct. 16, 2017, 15 pgs.

U.S. Appl. No. 14/800,640, Non Final Office Action dated Jun. 8, 2017, 14 pgs.

U.S. Appl. No. 14/800,640, Non Final Office Action dated Jul. 17, 2018, 16 pgs.

U.S. Appl. No. 14/800,640, Notice of Allowance dated Nov. 21, 2018, 7 pgs.

U.S. Appl. No. 14/800,640, Restriction Requirement dated Mar. 3, 2017, 5 pgs.

U.S. Appl. No. 14/800,642, Advisory Action dated Jan. 5, 2018, 3 pgs.

U.S. Appl. No. 14/800,642, Advisory Action dated Feb. 8, 2018, 3 pgs.

U.S. Appl. No. 14/800,642, Examiner Interview Summary dated Aug. 6, 2018, 1 pg.

U.S. Appl. No. 14/800,642, Final Office Action dated Oct. 17, 2017, 18 pgs.

U.S. Appl. No. 14/800,642, Non Final Office Action dated May 18, 2017, 17 pgs.

U.S. Appl. No. 14/800,642, Non-Final Office Action dated May 18, 2017, 17 pages.

U.S. Appl. No. 14/800,642, Notice of Allowance dated Aug. 6, 2018, 12 pgs.

U.S. Appl. No. 14/819,473, Examiner Interview Summary dated Jul. 11, 2016, 3 pgs.

U.S. Appl. No. 14/819,473, Examiner Interview Summary dated Aug. 17, 2016, 3 pgs.

U.S. Appl. No. 14/819,473, Examiner Interview Summary dated Oct. 14, 2016, 3 pages.

U.S. Appl. No. 14/819,473, Final Office Action dated Apr. 28, 2016, 45 pgs.

U.S. Appl. No. 14/819,473, Non Final Office Action dated Sep. 1, 2016, 36 pgs.

U.S. Appl. No. 14/819,473, Non Final Office Action dated Oct. 8, 2015, 44 pgs.

U.S. Appl. No. 14/860,983, Advisory Action dated Jan. 23, 2018, 3 pgs.

U.S. Appl. No. 14/860,983, Advisory Action dated Mar. 26, 2019, 2 pgs.

U.S. Appl. No. 14/860,983, Examiner Interview Summary dated Mar. 26, 2019, 2 pgs.

U.S. Appl. No. 14/860,983, Examiner Interview Summary dated Apr. 8, 2019, 3 pgs.

U.S. Appl. No. 14/860,983, Examiner Interview Summary dated Nov. 15, 2018, 3 pgs.

U.S. Appl. No. 14/860,983, Final Office Action dated Jan. 18, 2019, 19 pgs.

U.S. Appl. No. 14/860,983, Final Office Action dated Oct. 18, 2017, 21 pgs.

U.S. Appl. No. 14/860,983, Non Final Office Action dated Jun. 8, 2017, 26 pgs.

U.S. Appl. No. 14/860,983, Non Final Office Action dated Aug. 7, 2018, 22 pgs.

U.S. Appl. No. 15/408,211, Advisory Action dated Mar. 18, 2019, 4 pgs.

U.S. Appl. No. 15/408,211, Examiner Interview Summary dated Mar. 4, 2019, 3 pgs.

U.S. Appl. No. 15/408,211, Examiner Interview Summary dated Mar. 18, 2019, 2 pgs.

U.S. Appl. No. 15/408,211, Examiner Interview Summary dated Apr. 3, 2019, 3 pgs.

U.S. Appl. No. 15/408,211, Examiner Interview Summary dated Aug. 5, 2019, 3 pgs.

U.S. Appl. No. 15/408,211, Examiner Interview Summary dated Oct. 16, 2019, 2 pgs.

U.S. Appl. No. 15/408,211, Examiner Interview Summary dated Dec. 5, 2018, 3 pgs.

(56) References Cited

OTHER PUBLICATIONS

U.S. Appl. No. 15/408,211, Final Office Action dated Jan. 11, 2019, 23 pgs.
U.S. Appl. No. 15/408,211, Non Final Office Action dated Aug. 6, 2018, 22 pgs.
U.S. Appl. No. 15/408,211, Non Final Office Action dated May 2, 2019, 20 pgs.
U.S. Appl. No. 15/425,983, Advisory Action dated Oct. 12, 2018, 5 pgs.
U.S. Appl. No. 15/425,983, Examiner Interview Summary dated May 3, 2018, 3 pgs.
U.S. Appl. No. 15/425,983, Examiner Interview Summary dated May 17, 2018, 3 pgs.
U.S. Appl. No. 15/425,983, Examiner Interview Summary dated Sep. 28, 2018, 3 pgs.
U.S. Appl. No. 15/425,983, Examiner Interview Summary dated Oct. 12, 2018, 2 pgs.
U.S. Appl. No. 15/425,983, Examiner Interview Summary dated Dec. 12, 2018, 2 pgs.
U.S. Appl. No. 15/425,983, Final Office Action dated Jun. 26, 2018, 29 pgs.
U.S. Appl. No. 15/425,983, Non Final Office Action dated Jan. 11, 2018, 29 pgs.
U.S. Appl. No. 15/425,983, Notice of Allowance dated Dec. 12, 2018, 14 pgs.
U.S. Appl. No. 15/425,988, Examiner Interview Summary dated Nov. 30, 2018, 3 pages.
"U.S. Appl. No. 15/409,500, Examiner Interview Summary dated Mar. 5, 2019", 3 pages.
"U.S. Appl. No. 15/409,500, Non Final Office Action dated Dec. 11, 2018", 11 pgs.
"U.S. Appl. No. 15/409,500, Notice of Allowance dated Jun. 3, 2019", 8 pages.
"U.S. Appl. No. 15/601,863, Examiner Interview Summary dated Nov. 21, 2018", 4 pgs.
"U.S. Appl. No. 15/601,863, Non Final Office Action dated Sep. 20, 2018", 23 pages.
"U.S. Appl. No. 15/601,863, Notice of Allowance dated Jan. 24, 2019", 8 pages.
"International Application Serial No. PCT/US16/52192, Intl Search Report and Written Opinion dated Dec. 12, 2016", 8 pages.
"Intl Application Serial No. PCT/US16/52192, Intl Preliminary Report on Patentability dated Apr. 5, 2018", 7 pgs.
U.S. Appl. No. 14/860,983, Final Rejection, dated Feb. 12, 2020, 18 pgs.
U.S. Appl. No. 15/620,506, Notice of Allowance and Fees Due (Ptol-85), dated Mar. 2, 2020, 10 pgs.
U.S. Appl. No. 15/673,125, Final Rejection, dated Feb. 19, 2020, 17 pgs.
U.S. Appl. No. 15/713,406, Final Rejection, dated Feb. 19, 2020, 22 pgs.
U.S. Appl. No. 15/717,889, Non-Final Rejection, dated Oct. 27, 2020, 40 pgs.
U.S. Appl. No. 15/911,993, Non-Final Rejection, dated Aug. 5, 2020, 6 pgs.
U.S. Appl. No. 15/969,749, Final Rejection, dated Feb. 26, 2020, 15 pgs.
U.S. Appl. No. 15/969,749, Non-Final Rejection, dated Sep. 17, 2020, 15 pgs.
U.S. Appl. No. 16/179,746, Advisory Action (Ptol-303), dated Sep. 15, 2020, 2 pgs.
U.S. Appl. No. 16/179,746, Examiner Interview Summary Record (Ptol-413), Nov. 5, 2020, 2 pgs.
U.S. Appl. No. 16/362,547, Advisory Action (Ptol-303), dated Nov. 18, 2020, 2 pgs.
U.S. Appl. No. 16/362,547, Examiner Interview Summary Record (Ptol-413), dated Nov. 18, 2020, 1 pg.
U.S. Appl. No. 16/362,547, Final Rejection, dated Sep. 24, 2020,14 pgs.
U.S. Appl. No. 16/362,547,Examiner Interview Summary Record (Ptol-413), dated Nov. 5, 2020, 2 pgs.
U.S. Appl. No. 16/426,323, Notice of Allowance and Fees Due (Pto1-85), dated Aug. 5, 2020, 11 pgs.
U.S. Appl. No. 16/451,371, NOA—Notice of Allowance and Fees Due (Ptol-85), dated Sep. 17, 2020, 5 pgs.
U.S. Appl. No. 16/451,371, Non-Final Rejection, dated Jun. 11, 2020,—9 pgs.
U.S. Appl. No. 16/586,868, Notice of Allowance and Fees Due (Ptol-85), dated Oct. 7, 2020, 2 pgs.
U.S. Appl. No. 16/586,868, Notice of Allowance and Fees Due (Ptol-85), dated Jul. 31, 2020,13 pgs.
U.S. Appl. No. 16/586,868, USPTO e-Office Action: CTNF—Non-Final Rejection, dated Dec. 20, 2019, 19 pgs.
U.S. Appl. No. 16/726,090, Non-Final Rejection, dated Nov. 19, 2020, 12 pgs.
U.S. Appl. No. 16/778,981, Non-Final Rejection, dated Oct. 13, 2020,7 pgs.
U.S. Appl. No. 14/800,638, Non Final Office Action dated Jul. 29, 2016, 11 pgs.
U.S. Appl. No. 12/101,883, Examiner Interview Summary dated Sep. 6, 2016, 3 pgs.
U.S. Appl. No. 12/101,883, Examiner Interview Summary dated Oct. 18, 2017, 2 pgs.
U.S. Appl. No. 13/464,588, Non Final Office Action dated Aug. 2, 2019, 14 pgs.
U.S. Appl. No. 14/530,669, Advisory Action dated Aug. 8, 2017, 5 pgs.
U.S. Appl. No. 14/530,669, Examiner Interview Summary dated Apr. 14, 2017, 3 pgs.
U.S. Appl. No. 14/530,669, Examiner Interview Summary dated Aug. 8, 2017, 2 pgs.
U.S. Appl. No. 14/530,669, Final Office Action dated Apr. 20, 2017, 25 pgs.
U.S. Appl. No. 14/530,669, Non Final Office Action dated Jan. 3, 2017, 26 pgs.
U.S. Appl. No. 14/530,671, Non Final Office Action dated Jan. 3, 2017, 32 pgs.
U.S. Appl. No. 14/539,814, Non Final Office Action dated Dec. 30, 2016, 37 pgs.
U.S. Appl. No. 14/539,889, Non-Final Office Action dated Oct. 6, 2016, 14 pages.
U.S. Appl. No. 14/800,638, Advisory Action dated May 9, 2017, 5 pgs.
U.S. Appl. No. 14/800,638, Examiner Interview Summary dated May 9, 2017, 2 pgs.
U.S. Appl. No. 14/800,638, Examiner Interview Summary dated Nov. 7, 2016, 3 pgs.
U.S. Appl. No. 14/800,638, Examiner Interview Summary dated Dec. 13, 2017, 1 pg.
U.S. Appl. No. 14/800,638, Final Office Action dated Jan. 20, 2017, 12 pgs.
U.S. Appl. No. 14/800,638, Non Final Office Action dated Jun. 15, 2017, 12 pgs.
U.S. Appl. No. 14/800,638, Notice of Allowance dated Dec. 13, 2017, 9 pgs.
U.S. Appl. No. 14/800,640, Advisory Action dated Jan. 5, 2018, 3 pgs.
U.S. Appl. No. 15/425,988, Non Final Office Action dated Aug. 10, 2018, 18 pgs.
U.S. Appl. No. 15/425,988, Notice of Allowance dated Dec. 28, 2018, 8 pgs.
U.S. Appl. No. 15/426,994, Advisory Action dated Dec. 13, 2018, 3 pgs.
U.S. Appl. No. 15/426,994, Examiner Interview Summary dated Jan. 15, 2019, 3 pgs.
U.S. Appl. No. 15/426,994, Final Office Action dated Oct. 10, 2018, 21 pgs.
U.S. Appl. No. 15/426,994, Non Final Office Action dated Apr. 19, 2018, 22 pgs.
U.S. Appl. No. 15/426,994, Non Final Office Action dated Aug. 6, 2019, 22 pgs.

(56) References Cited

OTHER PUBLICATIONS

U.S. Appl. No. 15/427,009, Notice of Allowance dated Sep. 6, 2018, 9 pgs.
U.S. Appl. No. 15/428,104, Advisory Action dated Dec. 13, 2018, 3 pgs.
U.S. Appl. No. 15/428, 104, Examiner Interview Summary dated Jan. 15, 2019, 3 pgs.
U.S. Appl. No. 15/428,104, Examiner Interview Summary dated Dec. 7, 2018, 3 pgs.
U.S. Appl. No. 15/428,104, Final Office Action dated Oct. 10, 2018, 23 pgs.
U.S. Appl. No. 15/428,104, Non Final Office Action dated Apr. 19, 2018, 21 pgs.
U.S. Appl. No. 15/428,104, Non Final Office Action dated Aug. 6, 2019, 24 pgs.
U.S. Appl. No. 15/620,506, Advisory Action dated Aug. 26, 2019, 2 pgs.
U.S. Appl. No. 15/620,506, Examiner Inteview Summary dated Aug. 26, 2019, 1 pg.
U.S. Appl. No. 15/620,506, Final Office Action dated Jun. 10, 2019, 17 pgs.
U.S. Appl. No. 15/620,506, Non-Final Office Action dated Jan. 23, 2019, 13 pages.
U.S. Appl. No. 15/673,125, Examiner Interview Summary dated Aug. 1, 2019, 3 pgs.
U.S. Appl. No. 15/673,125, Final Office Action dated Jun. 3, 2019, 17 pgs.
U.S. Appl. No. 15/673,125, Non Final Office Action dated Feb. 6, 2019, 17 pgs.
U.S. Appl. No. 15/682,362, Notice of Allowance dated Oct. 22, 2018, 9 pgs.
U.S. Appl. No. 15/713,406, Examiner Interview Summary dated Aug. 2, 2019, 3 pgs.
U.S. Appl. No. 15/713,406, Final Office Action dated Jun. 3, 2019, 21 pgs.
U.S. Appl. No. 15/713,406, Non Final Office Action dated Jan. 30, 2019, 21 pgs.
U.S. Appl. No. 15/717,889, Advisory Action dated Jul. 6, 2021, 3 pgs.
U.S. Appl. No. 15/717,889, Examiner Interview Summary dated Jun. 4, 2021, 2 pgs.
U.S. Appl. No. 15/717,889, Examiner Interview Summary dated Jul. 6, 2021, 2 pgs.
U.S. Appl. No. 15/717,889, Final Office Action dated Mar. 4, 2021, 37 pgs.
U.S. Appl. No. 15/724,081, Examiner Interview Summary dated Mar. 4, 2019, 3 pgs.
U.S. Appl. No. 15/724,081, Examiner Interview Summary dated Jul. 30, 2019, 3 pgs.
U.S. Appl. No. 15/724,081, Examiner Interview Summary dated Aug. 20, 2019, 2 pgs.
U.S. Appl. No. 15/724,081, Final Office Action dated May 14, 2019, 14 pgs.
U.S. Appl. No. 15/724,081, Non Final Office Action dated Dec. 11, 2018, 12 pgs.
U.S. Appl. No. 15/724,081, Notice of Allowance dated Aug. 20, 2019, 12 pgs.
U.S. Appl. No. 15/724,087, Final Office Action dated Jul. 1, 2019, 16 pgs.
U.S. Appl. No. 15/724,087, Non Final Office Action dated Jan. 31, 2019, 15 pgs.
U.S. Appl. No. 15/911,993, Notice of Allowance dated Jan. 12, 2021, 8 pgs.
U.S. Appl. No. 15/963,896, Non Final Office Action dated Apr. 18, 2019, 7 pgs.
U.S. Appl. No. 15/963,896, Notice of Allowance dated May 22, 2019, 8 pgs.
U.S. Appl. No. 15/969,749, Examiner Interview Summary dated Apr. 20, 2021, 1 pg.
U.S. Appl. No. 16/179,746, Examiner Interview Summary dated Jun. 3, 2021, 1 pg.
U.S. Appl. No. 16/179,746, Final Office Action dated Jun. 3, 2021, 25 pgs.
U.S. Appl. No. 16/179,746, Non-Final Office Action dated Feb. 11, 2021, 25 pgs.
U.S. Appl. No. 16/362,547, Examiner Interview Summary dated Jul. 12, 2021, 2 pgs.
U.S. Appl. No. 16/362,547, Non-Final Office Action dated Mar. 23, 2021, 14 pgs.
U.S. Appl. No. 16/384,578, Corrected Notice of Allowance dated Nov. 26, 2019, 2 pgs.
U.S. Appl. No. 16/384,578, Non Final Office Action dated May 9, 2019, 9 pgs.
U.S. Appl. No. 16/726,090, Advisory Action dated Jun. 21, 2021, 3 pgs.
U.S. Appl. No. 16/726,090, Examiner Interview Summary dated Feb. 25, 2021, 3 pgs.
U.S. Appl. No. 15/632,709, Non-Final Rejection, dated May 22, 2020, 10 pgs.
U.S. Appl. No. 15/632,709, Examiner Interview Summary dated Apr. 30, 2018, 1 pg.
U.S. Appl. No. 15/632,709, Final Office Action dated Jul. 17, 2018, 12 pgs.
U.S. Appl. No. 15/632,709, Non Final Office Action dated Apr. 3, 2019, 13 pgs.
U.S. Appl. No. 15/632,709, Non Final Office Action dated Apr. 30, 2018, 14 pgs.
U.S. Appl. No. 15/632,709, Notice of Allowance dated May 3, 2021, 9 pgs.
Haines, Russell, U.S. Appl. No. 62/380,914, Specification and Drawings, p. 1-24 (Year: 2016).
Matsun08u, Toru etal., U.S. Appl. No. 62/457,276, Specification, p. 1-19 (Year: 2017).
Office Action (Non-Final Rejection) dated Apr. 14, 2022 for U.S. Appl. No. 17/338,217 (pp. 1-10).
Office Action (Non-Final Rejection) dated Sep. 22, 2021 for U.S. Appl. No. 16/726,090 (pp. 1-15).
Office Action (Non-Final Rejection) dated Oct. 14, 2021 for U.S. Appl. No. 15/427,030 (pp. 1-17).
Office Action (Non-Final Rejection) dated Oct. 28, 2021 for U.S. Appl. No. 16/813,506 (pp. 1-19).
Office Action (Non-Final Rejection) dated Nov. 10, 2021 for U.S. Appl. No. 16/389,544 (pp. 1-28).
Office Action (Notice of Allowance and Fees Due (PTOL-85)) dated Sep. 16, 2021 for U.S. Appl. No. 16/179,746 (pp. 1-5).
Office Action (Notice of Allowance and Fees Due (PTOL-85)) dated Sep. 29, 2021 for U.S. Appl. No. 15/717,889 (pp. 1-12).
Office Action (Notice of Allowance and Fees Due (PTOL-85)) dated Sep. 30, 2021 for U.S. Appl. No. 16/179,746 (pp. 1-2).
Office Action (Notice of Allowance and Fees Due (PTOL-85)) dated Oct. 15, 2021 for U.S. Appl. No. 16/179,746 (pp. 1-2).
Office Action dated Apr. 1, 2021 for U.S. Appl. No. 15/427,030 (pp. 1-18).
Office Action dated Apr. 1, 2021 for U.S. Appl. No. 16/389,544 (pp. 1-29).
Office Action dated Apr. 9, 2021 for U.S. Appl. No. 16/554,996 (pp. 1-29).
Office Action dated Jun. 3, 2021 for U.S. Appl. No. 16/179,746 (pp. 1-26).
Office Action dated Mar. 12, 2021 for U.S. Appl. No. 16/726,090 (pp. 1-14).
Office Action dated Mar. 23, 2021 for U.S. Appl. No. 16/362,547 (pp. 1-15).
Pollard, Stephen et al., "Automatically Synthesising Virtual Viewpoints by Trinocular Image Interpolation—Detailed Report", HP, Technical Report, HP Laboratories Bristol HPL-97-166, Dec. 1997, 40 pgs.
Prisacariu, Victor A. et al., "Simultaneous 3D Tracking and Reconstruction on a Mobile Phone", IEEE International Symposium on Mixed and Augmented Reality, 2013, pp. 89-98.
Qi Pan et al., "Rapid Scene Reconstruction on Mobile Phones from Panoramic Images", Oct. 2011, pp. 55-64 (Year: 2011).

(56) References Cited

OTHER PUBLICATIONS

Russell, Bryan C, etal. "LabelMe: a database and web-based tool forimage annotation." International Journal of Computer vision 77.1-3 (2008): 157-173. (Year: 2008).

Schiller, Ingo, et al., Datastructure for Capturing Dynamic Scenes with a Time-of-Flight Camera, Springer-Verlad, Dyna3D 2009, LNCS 5742, 42-57 pgs.

Seitz, Steven M., "Image-Based Transformation of Viewpoint and Scene Appearance", A Dissertation submitted in partial fulfillment of the requirements for the Degree of Doctor of Philosophy at the University of Wisconsin; retrieved from the Internet <http://homes.cs.washington.edu/~seitz/papers/thesis.pdf>, 1997, 111.

Shade, Jonathan et al., "Layered Depth Images", Proceedings of the 25th Annual Conference on Computer Graphics and Interactive Techniques, ACM, SIGGRAPH, Jul. 24, 1998, pp. 231-242.

Shin, Hong-Chang et al., "Fast View Synthesis using GPU for 3D Display", IEEE Transactions on Consumer Electronics, vol. 54, No. 4, Dec. 2008, pp. 2068-2076.

Snavely, Noah et al., "Photo Tourism: Exploring Phot Collections in 3D", ACM, ACM Transactions on Graphics (TOG)—Proceeding of ACM SIGGRAPH 2006, vol. 25, Issue 3, Jul. 2006, 835-846.

Steder, Bastian et al., "Robust On-line Model-based Object Detection from Range Images", International Conference on Intelligent Robots and Systems, pp. 4739-4744, Oct. 15, 2009, 6 pages.

Supplemental Notice of Allowability dated May 5, 2021 for U.S. Appl. No. 15/969,749 (pp. 1-2).

Thyssen, Anthony , "ImageMagick v6 Examples—Color Basics and Channels", Website http://www.imagemagick.org/Usage/color basics/, Retrieved Dec. 23, 2016, Mar. 9, 2011, 31 pgs.

Torr, P.H.S et al., "Robust Parameterization and Computation of the Trifocal Tensor", Elsevier, Image and Vision Computing, vol. 15, Issue 8, Aug. 1997, pp. 591-605.

United Kingdom Application Serial No. 1609577.0, Office Action dated Jun. 15, 2016, 1 pg.

Utasi, Ákos, and Csaba Benedek. "A multi-view annotation tool for people detection evaluation." Proceedings of the Ist international Workshop on Visual interfaces forground truth collection in Computer vision applications. ACM, 2012. (Year: 2012) 7 pages.

Weigel, Christian, et al., Advanced 3D Video Object Synthesis Based on Trilinear Tensors, IEEE Tenth International Symposium on Consumer Electronics, 2006, 5 pages.

Xiao, Jiangjian et al., "Tri-view Morphing", Elsevier, Computer Vision and Image Understanding, vol. 96, Issue 3, Dec. 2004, pp. 345-366.

Z. Cao et al., 'Realtime Multi-Person 2D Pose Estimation using Part Affinity Fields', In Proceedings of the IEEE Conference on Computer Vision and Pattern Recognition, Apr. 14, 2017, pp. 1-9 sections 2-3; and ffigure 2.

Zhang, Guofeng, et al., Video stabilization based on a 3D perspective camera model, Springer, The Visual Computer (2009) 25, 997 pg.

Zhang, Zhengyou, et al., A robust technique for matching two uncalibrated images through the recovery of the unknown epipolar geometry, Elsevier, Artificial Intelligence 78, 1995, 87-119 pgs.

U.S. Appl. No. 16/726,090, Examiner Interview Summary dated Jun. 21, 2021, 1 pg.

U.S. Appl. No. 16/778,981, Corrected Notice of Allowance dated Mar. 31, 2021, 11 pgs.

U.S. Appl. No. 16/778,981, Examiner Interview Summary dated Mar. 31, 2021, 1 pg.

U.S. Appl. No. 16/778,981, Notice of Allowance dated Mar. 9, 2021, 9 pgs.

Ballan, Luca etal., "Unstructured Video-Based Rendering: Interactive Exploration of Casually Captured Videos", ACM, ACM Transactions on Graphics (TOG)—Proceedings of ACM SIGGRAPH 2010, vol. 29, Issue 4, Article No. 87, Jul. 30, 2010, 11 pages.

Belongie, Serge, Jitendra Malik, and Jan Puzicha. "Shape matching and object recognition using shape contexts." IEEE Transactions on Pattern Analysis & Machine Intelligence 4 (2002): 509-522. (Year: 2002).

Buehler, Chris et al., "Unstructured Lumigraph Rendering", ACM, ACM SIGGRAPH, 2001, pp. 425-432.

Cao, Xun et al., "Semi-Automatic 2D-to-3D Conversion Using Disparity Propagation", IEEE, IEEE Transactions on Broadcasting, vol. 57, Issue 2, Apr. 19, 2011, pp. 491-499.

Chan, Shing-Chow et al., "An Object-Based Approach to Image/Video-Based Synthesis and Processing for 3-D and Multiview Televisions", IEEE, IEEE Transactions on Circuits and Systems for Video Technology, vol. 19, Issue 6, Mar. 16, 2009, pp. 821-831.

Chen, Shenchang E. , "QuickTime VR—An Image-Based Approach to Virtual Environment Navigation", ACM, SIGGRAPH '95 Proceedings of the 22nd annual Conference on Computer graphics and interactive techniques, 1995, 29-38.

Cläre, Adam , "Reality is a Game; What is Skybox?", retrieved from the Internet <http://www.realityisagame.com/archives/1776/what-is-a-skybox/>, Mar. 28, 2013, 5 pgs.

Davis, Abe et al., "Unstructured Light Fields", Blackwell Publishing, Computer Graphics Forum, vol. 31, Issue 2, Pt. 1, May 2012, pp. 305-314.

Extract all frames from video files, Video Help Forum, Oct. 2010, 3 pages.

Figueroa, Nadia, et al., "From Sense to Print: Towards Automatic 3D Printing from 3D Sensing Devices", IEEE, IEEE International Conference on Systems, Man, and Cybernetics (SMC, Oct. 13, 2013.).

Fischler, Martin A.., et al., Random Sample Consensus: A Paradigm for Model Fitting with Applications to Image Analysis and Automated Cartography, ACM, Communications of the ACM, vol. 24, No. 6, Jun. 1981, 381-395 pgs.

Fitzgibbon, Andrew , "Automatic 3D Model Acquisition and Generation of New Images from Video Sequences", IEEE, 9th European Signal Processing Conference, Sep. 1998, 8 pgs.

Fusiello, Andrea et al., "View Synthesis from Uncalibrated Images Using Parallax", Proceedings of the 12th International Conference on Image Analysis and Processing, 2003, pp. 146-151.

Fusiello, Andrea, Specifying Virtual Cameras In Uncalibrated View Synthesis, IEEE Transactions on Circuits and Systems for Video Technology, vol. 17, No. 5, May 2007, 8 pages.

Gatys et al., "A Neural Algorithm of Artistic Style", Cornell University, arXiv:1508.06576v2 pp. 1-16. (Year: 2015).

Gibson, Simon, et al., Accurate Camera Calibration for Off-line, Video-Based Augmented Reality, IEEE, Proceedings of the International Symposium on Mixed and Augmented Reality (ISMAR'02) 10 pages.

Golovinskly, Aleksey et al., "Shape-based Recognition of 3D Point Clouds in Urban Environment", IEEE, IEEE 12th International Conference on Computer Vision (ICCV), 2009, 2154-2161.

Gurdan, Tobias et al., "Spatial and Temporal Interpolation of MultiView Image Sequences", Department of Computer Science, Technische Universität München Ascending Technologies GmbH, Krailing, Germany, Section 2.3, Image Warping and Blending; Retrieved from the Internet <https://vision in.tum.de/ media/spezial/bib/gurdan-et-al-gcpr-2014.pdf>, 12.

International Application Serial No. PCT/US19/28807 Preliminary Report on Patentability dated Nov. 5, 209 pgs.

International Application Serial No. PCT/US19/28807 Search Report and Written Opinion dated Oct. 8, 2019, 12 pgs.

International Application Serial No. PCT/US19/30395, Preliminary Report on Patentability dated Nov. 12, 2020, 7 pgs.

International Application Serial No. PCT/US19/58204, Preliminary Report on Patentability dated May 14, 2021, 7 pgs.

International Application Serial No. PCT/US2016/042355, Search Report and Written Opinion dated Oct. 19, 2016, 9 pgs.

International Application Serial No. PCT/US2019/058204, Search Report and Written Opinion dated Apr. 21, 2010 pages.

Intl Application Serial No. PCT/US17/47684, Intl Preliminary Report on Patentability dated Feb. 28, 2019, 7 pgs.

Intl Application Serial No. PCT/US17/47684, Intl Search Report and Written Opinion dated Oct. 27, 2017, 8 pgs.

Intl Application Serial No. PCT/US17/47859, Intl Preliminary Report on Patentability dated Feb. 28, 2019, 7 pgs.

Intl Application Serial No. PCT/US17/47859, Intl Search Report and Written Opinion dated Nov. 2, 2017, 8 pgs.

(56) References Cited

OTHER PUBLICATIONS

Intl Application Serial No. PCT/US19/030395, Intl Search Report and Written Opinion dated Sep. 2, 2019, 9 pgs.
Intl Application Serial No. PCT/US2014/065282, Search Report & Written Opinion dated Feb. 23, 2015, 9 pgs.
Keller, Maik et al., "Real-Time 3D Reconstruction in Dynamic Scenes Using Point-Based Fusion", IEEE, 2013 International Conference on 3DTV, Jul. 1, 2013, 8 pages.
Klappstein, Jens, et al., Moving Object Segmentation Using Optical Flow and Depth Information, Springer, In: Wada T., Huang F., Lin S. (eds) Advances in Image and Video Technology. PSIVT 2009. LectureNotes in Computer Science, vol. 5414, 611-623 pgs.
Kottamasu, V. L. P., "User Interaction of One-Dimensional Panoramic Images for iPod Touch", Thesis, Linkoping University Electronic Press, LIU-IDA-LITH-EX-A-12/071-SE, Dec. 4, 2012, 70 pages.
Li, Mingyang, Byung Hyung Kim, and Anastasius 1. Mourikis. "Real-time motion tracking on a cellphone using inertial sensing and a rolling-shutter camera." 2013 IEEE International Conference on Robotics and Automation. IEEE, 2013. (Year: 2013) 8 pages.
Mian, Ajmal S. et al., "Three-Dimensional Model-Based Object Recognition and Segmentation in Cluttered Scenes", IEEE Transactions on Pattern Analysis and Machine Intelligence, col. 28, No. 10, Oct. 2006, 1584-1601.
Mikolajczyk, Krystian, et al., A Performance Evaluation of Local Descriptors, IEEE Transactions on Pattern Analysis and Machine Intelligence, vol. 27, No. 10, Oct. 2005, 1615-1630.
Notice of Allowance dated Apr. 20, 2021 for U.S. Appl. No. 15/969,749 (pp. 1-5).
Notice of Allowance dated Jun. 17, 2021 for U.S. Appl. No. 15/604,938 (pp. 1-12).
Notice of Allowance dated May 3, 2021 for U.S. Appl. No. 15/632,709 (pp. 1-9).
Nützi, Gabriel, et al. "Fusion of IMU and vision for absolute scale estimation in monocular SLAM." Journal of intelligent & robotic Systems 61.1-4 (2011): 287-299. (Year: 2011).
Office Action (Final Rejection) dated Jan. 19, 2022 for U.S. Appl. No. 16/726,090 (pp. 1-16).
Office Action (Final Rejection) dated Apr. 25, 2022 for U.S. Appl. No. 16/813,506 (pp. 1-17).
Office Action (Final Rejection) dated Aug. 20, 2021 for U.S. Appl. No. 16/362,547 (pp. 1-15).
Office Action (Non-Final Rejection) dated Mar. 21, 2022 for U.S. Appl. No. 14/861,019 (pp. 1-32).
Office Action (Non-Final Rejection) dated Mar. 24, 2022 for U.S. Appl. No. 16/362,547 (pp. 1-14).
Office Action (Final Rejection) dated Jul. 6, 2022 for U.S. Appl. No. 14/861,019 (pp. 1-36).
Office Action (Final Rejection) dated Jul. 22, 2022 for U.S. Appl. No. 15/427,030 (pp. 1-18).
Office Action (Notice of Allowance and Fees Due (PTOL-85)) dated May 18, 2022 for U.S. Appl. No. 16/389,544 (pp. 1-8).
Office Action (Notice of Allowance and Fees Due (PTOL-85)) dated Jun. 2, 2022 for U.S. Appl. No. 16/726,090 (pp. 1-7).
Office Action (Notice of Allowance and Fees Due (PTOL-85)) dated Jun. 29, 2022 for U.S. Appl. No. 17/338,217 (pp. 1-9).

* cited by examiner

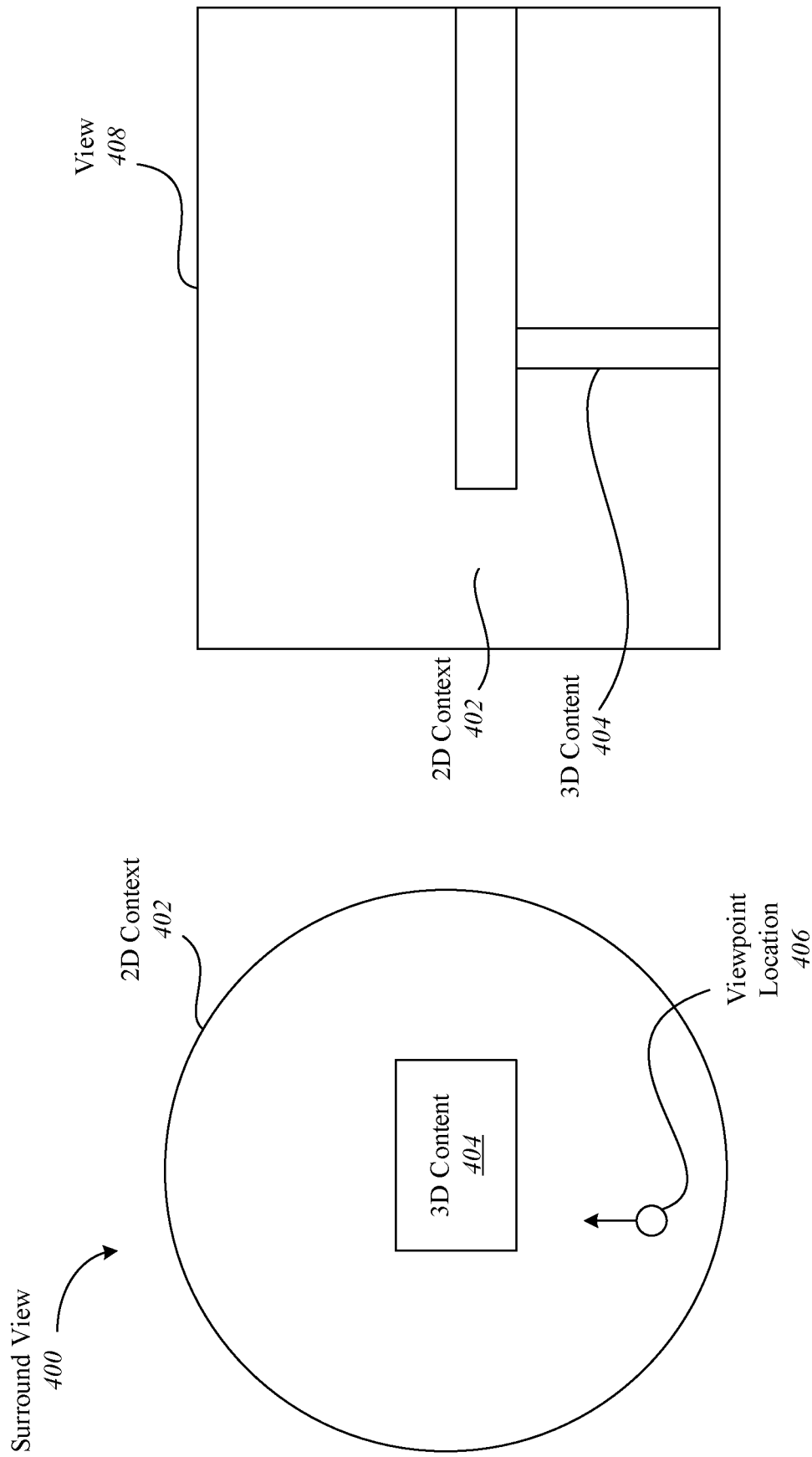

MODIFICATION OF MULTI-VIEW INTERACTIVE DIGITAL MEDIA REPRESENTATION

CROSS-REFERENCE TO RELATED APPLICATION

This application claims priority to and is a continuation of co-pending U.S. patent application Ser. No. 15/632,709 by Holzer et al., filed Jun. 26, 2017, which is hereby incorporated by reference in its entirety and for all purposes.

TECHNICAL FIELD

The present disclosure relates to modification of a multi-view interactive digital media representation (MVIDMR).

DESCRIPTION OF RELATED ART

Various image capturing applications and devices, such as smartphone cameras and applications, are popular with consumers. Large numbers of people use these types of applications and devices, and people of varied backgrounds, interests, and demographics make use of these features. These image capturing applications include capabilities relating to taking and storing images and three-dimensional views, such as panoramas, 360 degree views, etc. Such applications help people to save images of various people, places, and events.

Although these capturing applications and devices allow users to record and store various views, these applications and devices are typically limited to providing the images or views as they were recorded. However, users and providers of the applications and devices may want to modify or edit the images and/or views for various reasons. Although existing photo editing software allows users to modify two-dimensional images, existing technology typically does not provide editing capabilities for three-dimensional views. Accordingly, it is desirable to develop improved mechanisms and processes for modifying three-dimensional views.

OVERVIEW

Provided are various mechanisms and processes relating to inserting a visual element into a multi-view interactive digital media representation (MVIDMR).

In one aspect, which may include at least a portion of the subject matter of any of the preceding and/or following examples and aspects, a process includes analyzing an MVIDMR to determine if there is an appropriate location to insert a visual element. Once a location is found, the type of visual element appropriate for the location is determined, where the type of visual element includes either a three-dimensional object to be inserted in the MVIDMR or a two-dimensional image to be inserted as or projected onto a background or object in the MVIDMR. A visual element that is appropriate for the location is then retrieved and inserted into the MVIDMR, such that the visual element is integrated into the MVIDMR and navigable by a user.

In another aspect, which may include at least a portion of the subject matter of any of the preceding and/or following examples and aspects, a process includes receiving images and associated information from a mobile device, where the images include views of a scene captured from different locations. The process further includes generating an MVIDMR from the images and associated information and analyzing the MVIDMR to determine if there is an appropriate location to insert a visual element. Next, a type of visual element that is appropriate for the location is determined, where the type of visual element is a three-dimensional object to be inserted in the MVIDMR or a two-dimensional image to be inserted as or projected onto a surface, background scenery, or three-dimensional object within the MVIDMR. A visual element that is appropriate for the location within the MVIDMR is then retrieved and inserted into the MVIDMR to generate an augmented MVIDMR, such that the visual element is integrated into the augmented MVIDMR and navigable by the user. The augmented MVIDMR is then transmitted to the mobile device.

In yet another aspect, which may include at least a portion of the subject matter of any of the preceding and/or following examples and aspects, a system includes an MVIDMR server and MVIDMR storage device, which are designed to insert a visual element into an MVIDMR, where the MVIDMR is a multi-view interactive digital media representation that includes multiple views of a scene from different locations that can be navigated in three dimensions on a mobile device by a user. In one example, the MVIDMR server is designed to analyze an MVIDMR to determine if there is an appropriate location to insert a visual element, determine the type of visual element that is appropriate for the location, retrieve a visual element that is appropriate for the location within the MVIDMR, and insert the visual element into the MVIDMR, such that the visual element is integrated into the MVIDMR and navigable by the user. The MVIDMR storage device is designed to store multiple MVIDMRs, where the multiple MVIDMRs are retrievable and viewable at one or more mobile devices.

In yet another aspect, which may include at least a portion of the subject matter of any of the preceding and/or following examples and aspects, a computer readable medium includes computer code for analyzing an MVIDMR to determine if there is an appropriate location to insert a visual element and a type of visual element that is appropriate for the location, where the type of visual element is a three-dimensional object to be inserted in the MVIDMR or a two-dimensional image to be inserted as or projected onto a background or object in the MVIDMR. The computer readable medium further includes computer code for retrieving a visual element that is appropriate for the location within the MVIDMR and inserting the visual element into the MVIDMR, such that the visual element is integrated into the MVIDMR and navigable by the user.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present invention.

FIG. 4A illustrates one example of a top view of an MVIDMR that includes 3D content and 2D context.

FIG. 4B illustrates one example of a view from a particular viewpoint location of an MVIDMR.

DETAILED DESCRIPTION

Figure 1:
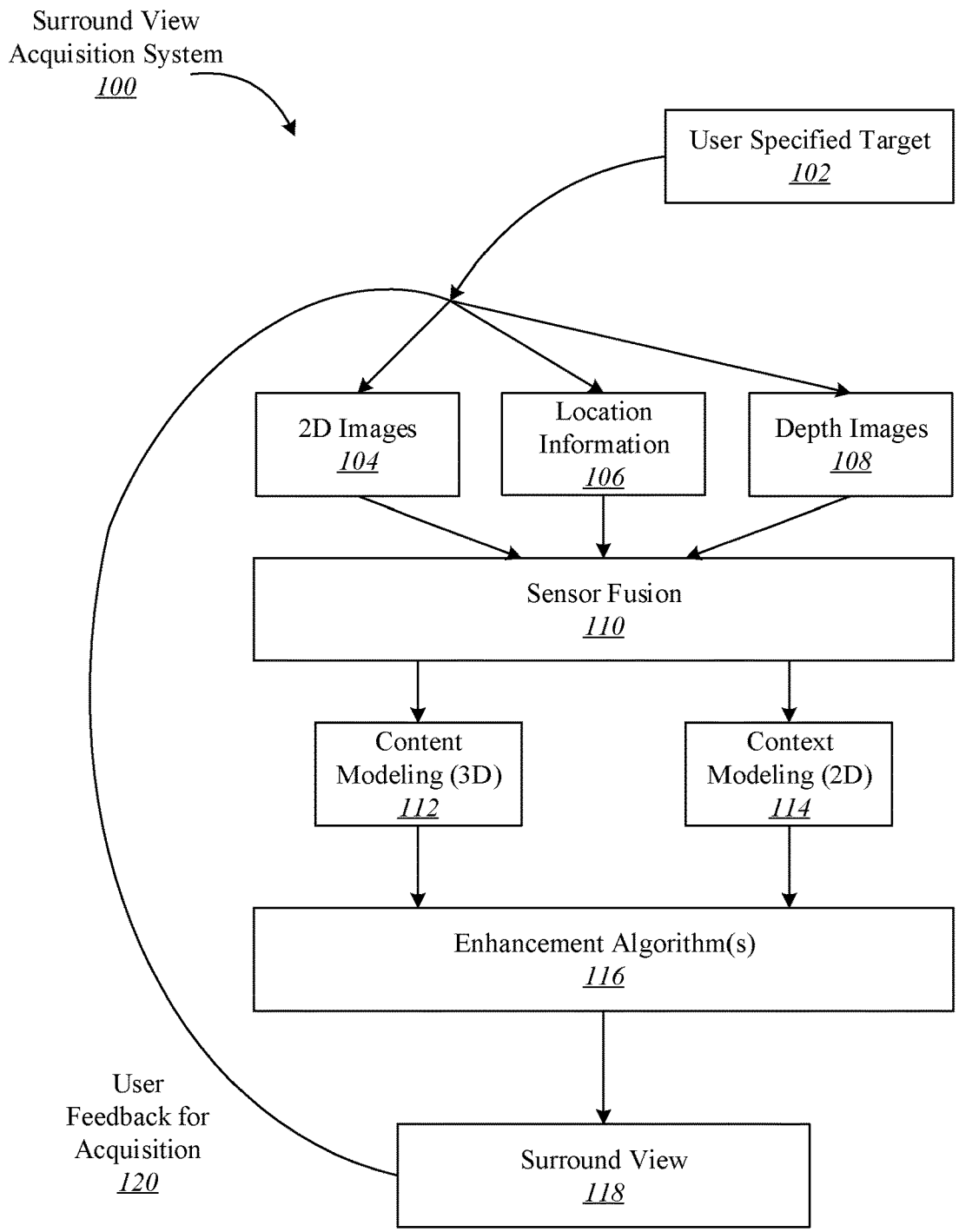
FIG. 1 illustrates an example of an MVIDMR acquisition system.

Reference will now be made in detail to some specific examples of the present disclosure including the best modes contemplated by the inventors for carrying out various embodiments of the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Image capturing applications and devices, such as smartphone cameras and applications, are popular with consumers. These image capturing applications include capabilities relating to taking and storing images and three-dimensional views, such as panoramas, 360 degree views, etc. These images and three-dimensional views of various people, places, and events, serve to preserve memories for many users.

One type of three-dimensional (3D) view is a multi-view digital media representation. An MVIDMR provides an interactive experience for a user that allows the user to navigate through the MVIDMR such that the user can move around the scene virtually. For instance, the user can move around an object to see different sides of the object. In particular, the user can either provide touch input, such as swiping or tapping the screen, or movement, such as tilting and/or translating the device, to navigate through an MVIDMR that is displayed on a smart phone or other device.

According to various embodiments, mechanisms and processes are provided that allow modification of an MVIDMR. For instance, backgrounds, objects, or other aspects can be added to an MVIDMR according to the desires of the user, a provider, or an advertiser. In one particular application, an MVIDMR can be modified by adding a visual element to the scene. A visual element may be an object, an image, a video, an advertisement, etc. In particular, a visual element can be a 2D background or 3D object that can be inserted into an MVIDMR, such that the inserted material is navigable with the rest of the MVIDMR. According to various embodiments, visual elements are advertisements. Although advertisements are used as examples of visual elements in some of the following description, it should be noted that visual elements are not limited to advertisements.

Typically, advertisements are used to promote a product, brand, movie, show, idea, or other interest by advertisers. These advertisements can take various forms such as print ads in newspapers and magazines, banner ads on websites, video ads shown before, during, or after a video media presentation (such as a television show or an online video), or billboard ads along roadways. Advertisers want to reach as many consumers as possible through numerous platforms and channels. Accordingly, advertisers are always looking for new and additional places to provide advertisements that will reach viewers.

Currently, advertisements are displayed through various applications, such as smartphone applications, in the form of banner or video advertisements. In addition, these advertisements may be included on a website or other digital interface. However, if these advertisements are used with programs or applications that display images and three-dimensional views, these banner and video advertisements can often be intrusive and distracting to the viewer. Accordingly, various embodiments herein describe improved mechanisms and processes for presenting advertisements to users viewing images or three-dimensional views through applications, websites, or other digital interfaces.

According to various example embodiments, improved mechanisms and processes are described that allow advertisements to be inserted into MVIDMRs. In particular, a two-dimensional (2D) and/or three-dimensional (3D) advertisement can be integrated into an MVIDMR, such that the advertisement is part of the MVIDMR that the user can navigate. For instance, an object with branding information can be inserted into an MVIDMR as a 3D advertisement. A user can navigate around this 3D object just like any other object in the MVIDMR. In some examples, a 2D advertisement can be included as a background or scenery for the MVIDMR. In addition, a 2D advertisement can also be projected onto a planar or 3D surface within the MVIDMR, in particular examples.

Implementing improved mechanisms and processes for including advertisements in 3D images, such as multi-view digital media representations or MVIDMRs, provides numerous benefit and advantages. For instance, digital applications and programs that are used to view MVIDMRs can obtain funding from advertisers wishing to purchase advertising space within MVIDMRs. Because providers of the digital applications and programs would receive at least partial funding from advertisers, the providers have the option of offering free or reduced priced applications and programs to users. In addition, advertisements can be presented to the user in a way that enhances their experience when viewing the images and three-dimensional views. Specifically, the advertisements can make scenes more pleasant or can add decorative aspects that improve the overall aesthetic of an MVIDMR.

Although MVIDMRs can be modified by the insertion of advertisements, the modification of MVIDMRs can be extended to many different uses. If an advertisement or branding information is not used, 2D backgrounds or images and/or 3D objects can also be provided as tools for users to modify or edit their MVIDMRs. For instance, users may want to augment existing MVIDMRs with additional elements or features. The provider of the program or application for viewing MVIDMRs can provide various 2D and 3D elements or features that can be used in the MVIDMRs as part of the software or application. In some implementations, these modification features can be provided for a fee. For instance, users may purchase virtual items a la carte to place in a particular MVIDMR, or users can pay for the use of the modification features. In some examples, the provider can provide periodic updates to the 2D and 3D content available to the users.

With reference to FIG. 1, shown is an example of an MVIDMR acquisition system that can be used to generate an MVIDMR. As described in various examples herein, an MVIDMR can be augmented with an advertisement, which may take the form of a 2D or 3D advertisement that is inserted into the MVIDMR. Specifically, in some examples, a 2D advertisement can be projected onto a planar or dimensional surface of an object or background scenery within an MVIDMR. In other examples, a 3D advertisement that includes at least one 3D object can be inserted into an MVIDMR, such that the 3D object is navigable with the rest of the MVIDMR.

In the present example embodiment, the MVIDMR acquisition system 100 is depicted in a flow sequence that can be used to generate an MVIDMR. According to various embodiments, the data used to generate an MVIDMR can come from a variety of sources. In particular, data such as, but not limited to two-dimensional (2D) images 104 can be used to generate an MVIDMR. These 2D images can include color image data streams such as multiple image sequences, video data, etc., or multiple images in any of various formats for images, depending on the application. Another source of data that can be used to generate an MVIDMR includes location information 106. This location information 106 can be obtained from sources such as accelerometers, gyroscopes, magnetometers, GPS, WiFi, IMU-like systems (Inertial Measurement Unit systems), and the like. Yet another source of data that can be used to generate an MVIDMR can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, an MVIDMR can be generated from a combination of data that includes both 2D images 104 and location information 106, without any depth images 108 provided. In other embodiments, depth images 108 and location information 106 can be used together at sensor fusion block 110. Various combinations of image data can be used with location information at 106, depending on the application and available data.

In the present example embodiment, the data that has been fused together at sensor fusion block 110 is then used for content modeling 112 and context modeling 114. During this process, the subject matter featured in the images is separated into content and context. The content is delineated as the object(s) of interest and the context is delineated as the scenery surrounding the object(s) of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 are generated by combining the image and location information data.

According to various embodiments, context and content of an MVIDMR are determined based on a specified object of interest. In some examples, an object of interest is automatically chosen based on processing of the image and location information data. For instance, if a dominant object is detected in a series of images, this object can be selected as the content. In other examples, a user specified target 102 can be chosen. It should be noted, however, that an MVIDMR can be generated without a user specified target in some applications.

In the present example embodiment, one or more enhancement algorithms is applied at enhancement algorithm(s) block 116. In particular example embodiments, various algorithms can be employed during capture of MVIDMR data, regardless of the type of capture mode employed. These algorithms can be used to enhance the user experience. For instance, automatic frame selection, stabilization, view interpolation, filters, and/or compression can be used during capture of MVIDMR data. In some examples, these enhancement algorithms can be applied to image data after acquisition of the data. In other examples, these enhancement algorithms can be applied to image data during capture of MVIDMR data.

According to particular example embodiments, automatic frame selection is used to create a more enjoyable MVIDMR. Specifically, frames are automatically selected so that the transition between them will be smoother or more even. This automatic frame selection can incorporate blur- and overexposure-detection in some applications, as well as more uniformly sampling poses so that they are more evenly distributed.

In some example embodiments, stabilization is used for an MVIDMR in a manner similar to that used for video. In particular, key frames in an MVIDMR can be stabilized to produce improvements such as smoother transitions, improved/enhanced focus on the content, etc. However, unlike video, there are many additional sources of stabilization for an MVIDMR, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for an MVIDMR. Because points of interest in an MVIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques are also used to provide stabilization for MVIDMRs. For instance, key points are detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because an MVIDMR is often focused on a particular object of interest, an MVIDMR can be content-weighted so that the object of interest is maximally stabilized in some examples.

Another way to improve stabilization in an MVIDMR includes direct selection of a region of a screen. For instance, if a user taps to focus on a region of a screen, then records a convex MVIDMR, the area that was tapped can be maximally stabilized. This allows stabilization algorithms to be focused on a particular area or object of interest.

In some examples, face detection is used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic key points.

According to various examples, view interpolation is used to improve the viewing experience. In particular, to avoid sudden "jumps" between stabilized frames, synthetic, intermediate views can be rendered on the fly. This can be informed by content-weighted key point tracks and IMU information as described above, as well as by denser pixel-to-pixel matches. If depth information is available, fewer artifacts resulting from mismatched pixels may occur, thereby simplifying the process. As described above, view interpolation can be applied during capture of an MVIDMR in some embodiments. In other embodiments, view interpolation can be applied during MVIDMR generation.

In some examples, filters are also used during capture or generation of an MVIDMR to enhance the viewing experience. Just as many popular photo sharing services provide aesthetic filters that can be applied to static, two-dimensional images, aesthetic filters can similarly be applied to surround images. However, because an MVIDMR representation is more expressive than a two-dimensional image, and three-dimensional information is available in an MVIDMR, these filters can be extended to include effects that are ill-defined in two-dimensional photos. For instance, in an MVIDMR, motion blur can be added to the background (i.e. context) while the content remains crisp. In another example, a drop-shadow can be added to the object of interest in an MVIDMR.

In various examples, compression is also used as an enhancement algorithm 116. In particular, compression can be used to enhance user-experience by reducing data upload and download costs. Because MVIDMRs use spatial information, far less data can be sent for an MVIDMR than a typical video, while maintaining desired qualities of the MVIDMR. Specifically, the IMU, key point tracks, and user input, combined with the view interpolation described above, can all reduce the amount of data that must be transferred to and from a device during upload or download of an MVIDMR. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, an MVIDMR 118 is generated after any enhancement algorithms are applied. The MVIDMR provides a multi-view interactive digital media representation. In various examples, the MVIDMR includes a three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MVIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MVIDMRs that allow the MVIDMRs to be indexed with a high degree of efficiency and accuracy; and the ability of the user to interact and change the viewpoint of the MVIDMR. In particular example embodiments, the characteristics described above can be incorporated natively in the MVIDMR representation, and provide the capability for use in various applications. For instance, MVIDMRs can be used as sites for advertisements, such as 2D and 3D advertisements, because such advertisements can be inserted into or relative to the content and/or context of the MVIDMRs.

According to various example embodiments, once an MVIDMR 118 is generated, user feedback for acquisition 120 of additional image data can be provided. In particular, if an MVIDMR is determined to need additional views to provide a more accurate model of the content or context, a user may be prompted to provide additional views. Once these additional views are received by the MVIDMR acquisition system 100, these additional views can be processed by the system 100 and incorporated into the MVIDMR.

Figure 2:
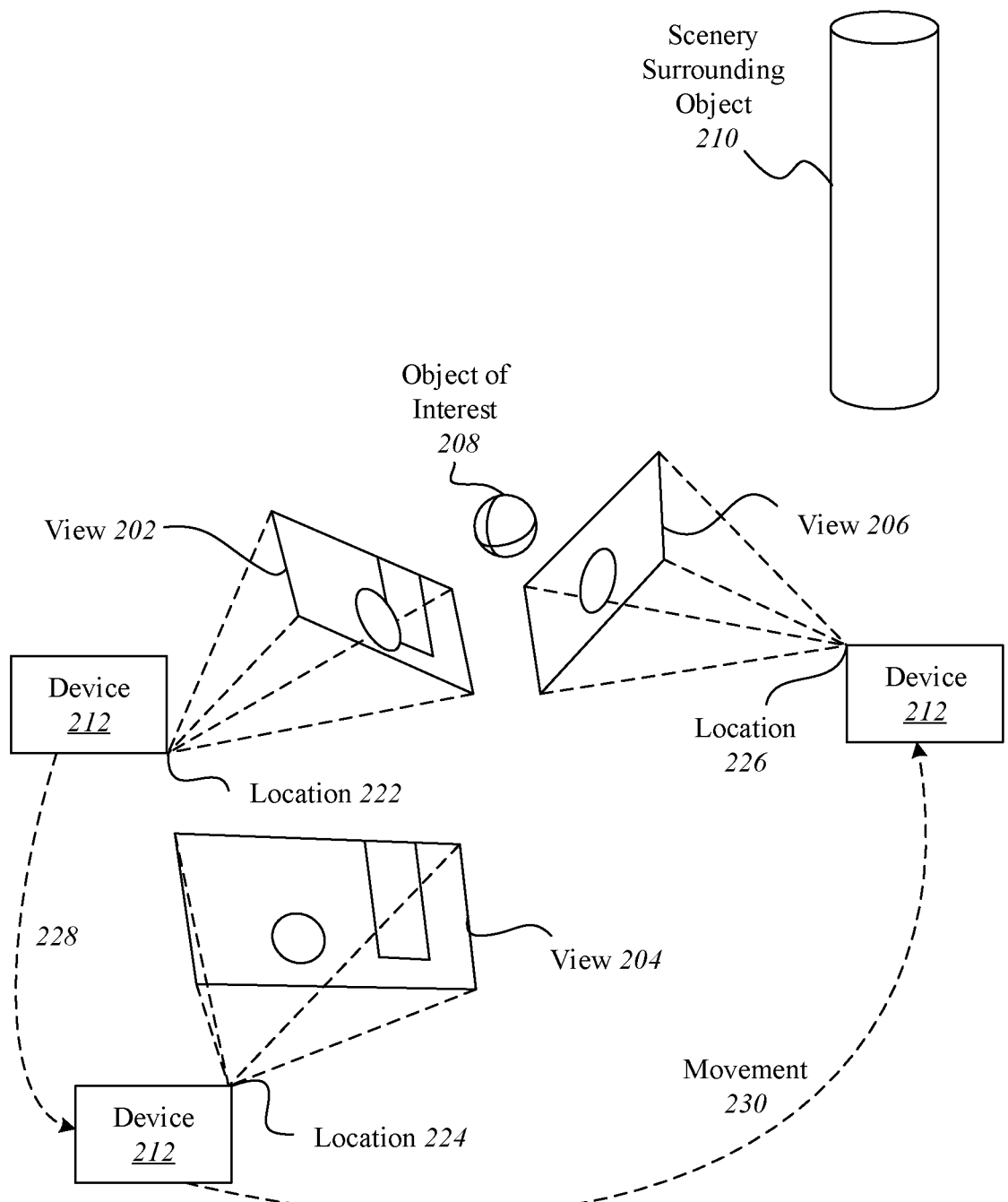
FIG. 2 illustrates an example of a device capturing multiple views of an object of interest from different locations for an MVIDMR.

With reference to FIG. 2, shown is an example of a device capturing multiple views of an object of interest from different locations for an MVIDMR. The capture device is indicated as camera 212, and moves from location 222 to location 224 and from location 224 to location 226. The multiple camera views 202, 204, and 206 captured by camera 212 are fused together into a three-dimensional (3D) model. According to various embodiments, multiple images are captured from various viewpoints and fused together to provide a multi-view digital media representation, such as an MVIDMR.

In the present example embodiment, camera 212 moves to locations 222, 224, and 226, respectively, along paths 228 and 230, in proximity to an object of interest 208. Scenery can surround the object of interest 208 such as object 210. Views 202, 204, and 206 are captured by camera 212 from locations 222, 224, and 226 and include overlapping subject matter. Specifically, each view 202, 204, and 206 includes the object of interest 208 and varying degrees of visibility of the scenery surrounding the object 210. For instance, view 202 includes a view of the object of interest 208 in front of the cylinder that is part of the scenery surrounding the object 208. View 204 shows the object of interest 208 to one side of the cylinder, and view 206 shows the object of interest without any view of the cylinder.

In the present example embodiment, the various views 202, 204, and 206 along with their associated locations 222, 224, and 226, respectively, provide a rich source of information about object of interest 208 and the surrounding context that can be used to produce an MVIDMR. For instance, when analyzed together, the various views 202, 204, and 206 provide information about different sides of the object of interest and the relationship between the object of interest and the scenery. These views also provide information about the relative size and scale of the object of interest in relation to the scenery. Furthermore, views from different sides of the object provide information about the shape and texture of the object. According to various embodiments, this information can be used to parse out the object of interest 208 into content and the scenery 210 as the context. In particular examples, distinctions between the content and context can be used to insert advertisements as 2D or 3D advertisements into the MVIDMR.

Figure 3:
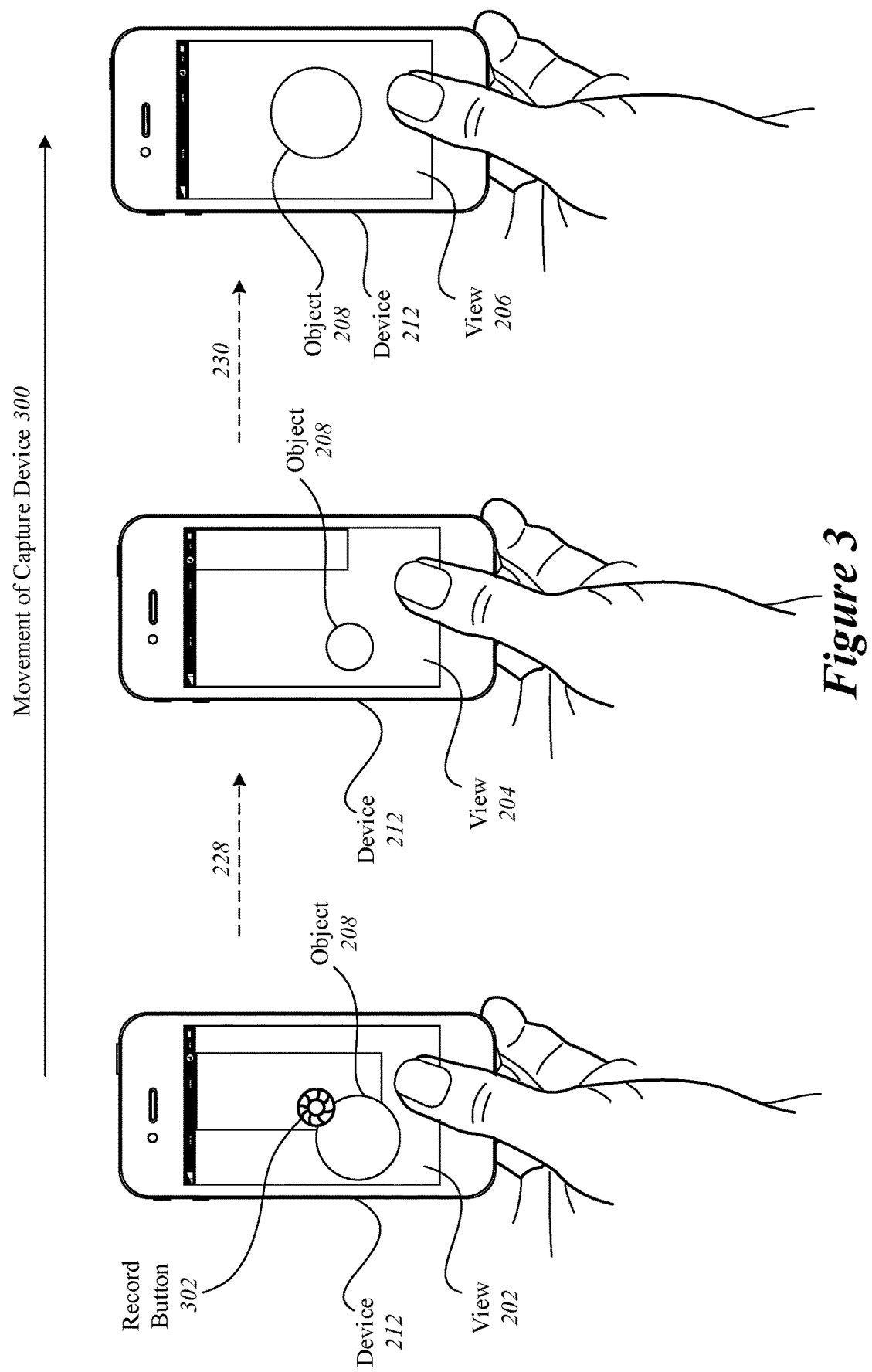
FIG. 3 illustrates an example of a device capturing views of an object of interest for an MVIDMR.

With reference to FIG. 3, shown is an example of a device capturing views of an object of interest for an MVIDMR. During a capture session, multiple views of the object 208 are captured by the device 212 from different locations. In the present example, data is acquired when a user taps a record button 302 on capture device 212 to begin recording images of the object 208. The user moves 300 the capture device 212 from location 222 to location 224 along path 228 and from location 224 to location 226 along path 230. In some examples, prompts for the user to capture particular views can be provided during the session in order to improve the accuracy of the MVIDMR. In particular, the system can prompt the user to move the device 212 in a particular direction or may prompt the user to provide additional information. Once the user has finished capturing images of the object for the MVIDMR, the user may choose to stop recording by tapping the record button 302 again. In other examples, the user can tap and hold the record button during the session, and release to stop recording. In the present example, the recording captures a series of images that can be used to generate an MVIDMR.

Similarly, an MVIDMR can be viewed through an application on a device 212. Instead of tapping a record button and capturing images, the user moves the device 212 around or provides inputs to the screen, such as by tapping or swiping, to navigate through an MVIDMR. In particular, by navigating through the MVIDMR, the user can view object 208 from various view points and locations around the object 208.

Figure 4D:
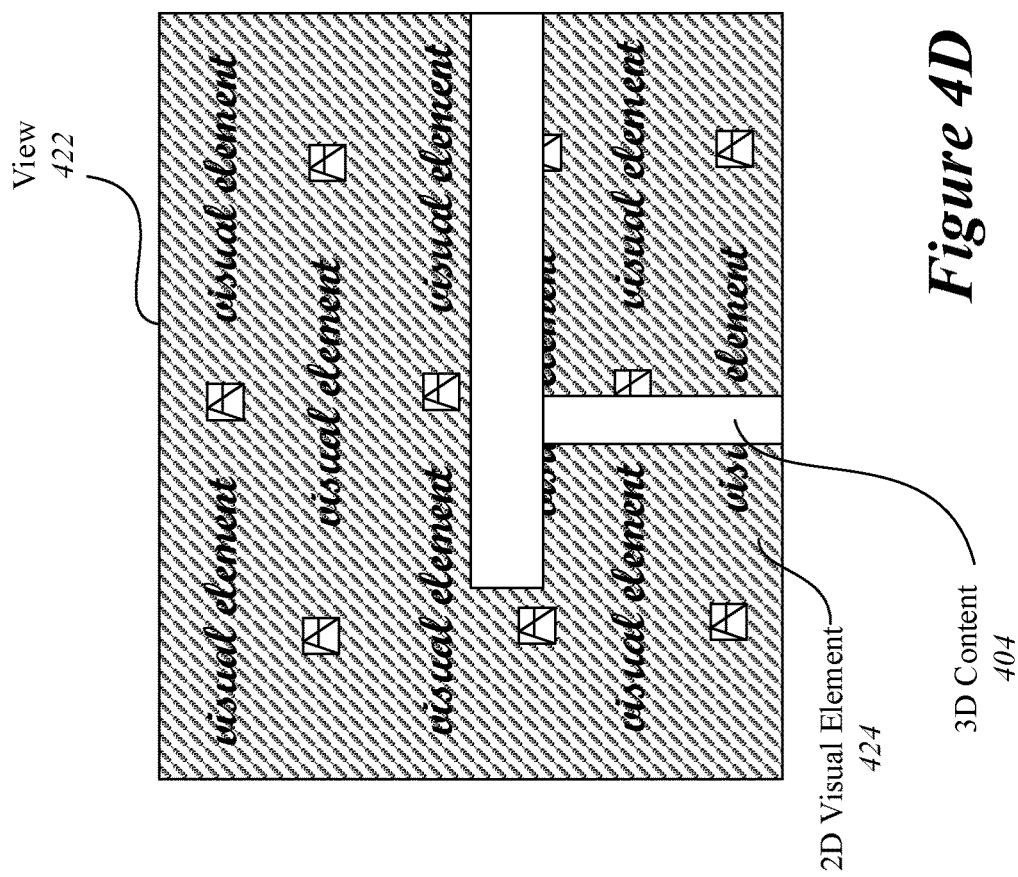
FIG. 4D illustrates one example of a view from an MVIDMR augmented with a 2D visual element.
Figure 4C:
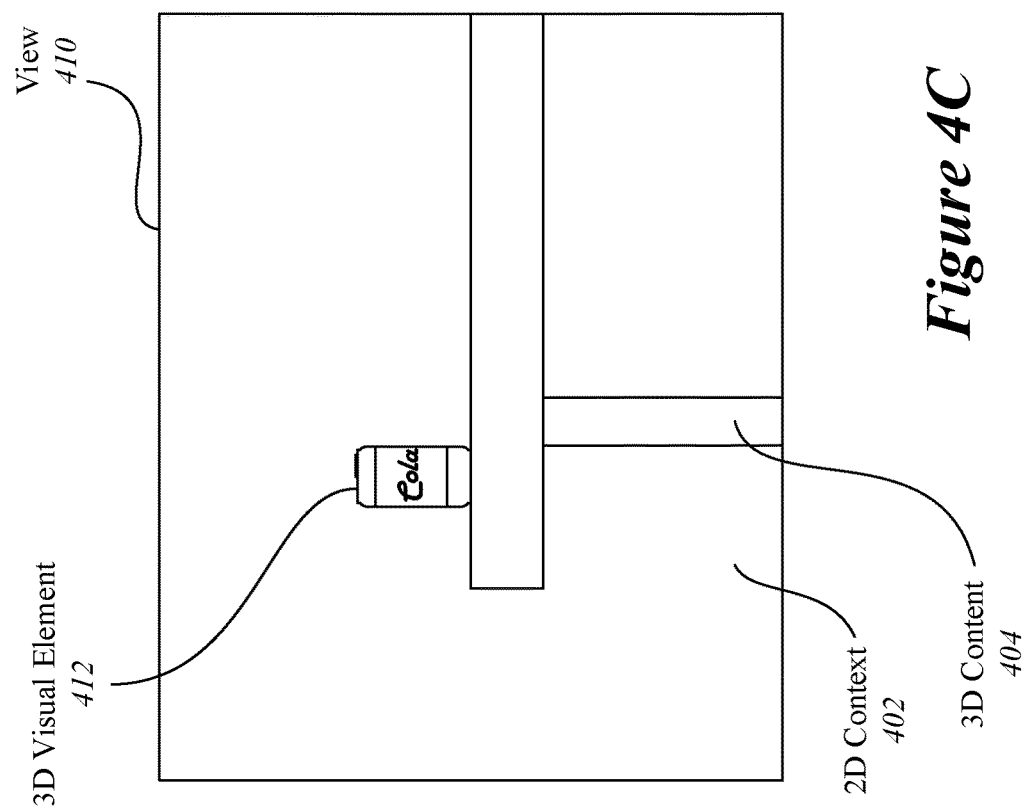
FIG. 4C illustrates one example of a view from an MVIDMR augmented with a 3D visual element.

FIGS. 4A-4D illustrate examples of MVIDMRs before and after the insertion of visual elements such as advertisements. In particular, FIGS. 4A and 4B illustrate a view from a particular location in an MVIDMR, and FIGS. 4C and 4D illustrate the same view after the insertion of 3D and 2D advertisements, respectively. It should be noted that although an MVIDMR can include real-life images and views, an MVIDMR and the insertion of advertisements into an MVIDMR can also be used with virtual reality or augmented reality MVIDMRs as well. Accordingly, MVIDMRs that include virtual reality or augmented reality can be navigated like other MVIDMRs and content and context can be separated in these MVIDMRs as well. As such, the examples and processes described with regard to inserting advertisements into an MVIDMR apply to virtual reality and augmented reality implementations, as well as real-life or other MVIDMR implementations.

With reference to FIG. 4A, shown is one example of a top view of an MVIDMR that includes 3D content and 2D context. Specifically, MVIDMR 400 includes 3D Content 404, which is depicted as a three-dimensional table, and 2D Context 402, which is depicted as a cylindrical background with 2D scenery projected onto it. In the present example, the MVIDMR 400 is being viewed from viewpoint location 406. As indicated by the arrow originating from viewpoint location 406, the view from this location includes one end of the table that forms 3D content 404, with 2D Context 402 visible in the background. This view 408, from viewpoint location 406, is depicted in FIG. 4B.

With reference to FIG. 4B, shown is one example of a view from a particular viewpoint location of an MVIDMR. In this view 408, a side view of the table described with regard to FIG. 4A is shown. Specifically, the table is depicted as 3D content 404, and the background is shown as 2D context 402. From this view 408, numerous locations are visible that would be appropriate for advertisements. In particular, these locations would be appropriate places to insert a 2D or 3D advertisement in the MVIDMR. For instance, items, such as 3D advertisements can be placed on the table 404. Additionally, 2D advertisements can be projected onto the background 2D context 402. In some examples, 2D advertisements can also be projected onto the surfaces of the table. Furthermore, 3D advertisements can also be placed next to, behind, under, or near the table. These 2D and 3D advertisements can serve to promote products and/or brands, but they can also add aesthetic and functional elements to an MVIDMR. In particular, the 2D and 3D advertisements can add to the overall decor, colors, and style of a particular MVIDMR. For instance, a plain room could have decorative wallpaper projected onto the wall, where the wallpaper also includes branding logos, but improves the overall look of the room. In another example, 2D and 3D advertisements in the form of furniture, stuffed animals, vases, cups, etc. can be placed in a room to complement the already existing features of the room. These advertisements can both provide promotional value to the advertisers and functional value to a user that is experiencing an MVIDMR.

With reference to FIG. 4C, shown is one example of a view from an MVIDMR that has been augmented with a 3D advertisement. In particular, view 410 includes the 3D content 404 and 2D context 402 shown in view 408 of FIG. 4B, but also includes the insertion of 3D advertisement 412. Specifically, 3D advertisement 412 is a soda can placed on a surface of table 404. In some examples, the 3D advertisement 412 is the product that the advertiser wishes to promote, such as the soda itself, which may include associated branding information on the object. In other examples, the 3D advertisement includes branding information on the object, even though the object itself may not be the product the advertiser is trying to promote. For instance, an insurance ad can be featured on the soda can to promote the insurance company. In this augmented MVIDMR, the 3D advertisement 412 is integrated into the MVIDMR such that the soda can is navigable in three dimensions along with the table.

With reference to FIG. 4D, shown is one example of a view from an MVIDMR augmented with a 2D advertisement. In particular, view 422 includes the 3D content 404 of FIG. 4B, but also includes the insertion of 2D advertisement 424 as background scenery. Specifically, 2D advertisement 424 is shown as a wallpaper-type background with logo and text information that has been inserted in place of the 2D context 402 shown in FIG. 4B.

Although the 2D advertisement 424 has replaced the 2D context 402 in this example, it is possible in some examples to integrate the 2D advertisement 424 into the 2D context 402. For instance, if the 2D advertisement 424 is semi-transparent, it may be included as an overlay on top of 2D context 402. In other examples, 2D advertisement 424 may cover a portion of 2D context 402, such as an area in a picture frame, window, etc. For instance, if 2D advertisement 424 is a poster, the poster can be inserted onto the wall of the scene. In yet other examples, the 2D advertisement may be projected onto a plane or surface within the MVIDMR, such as in a picture frame that is already included in the MVIDMR, or on a surface, such as a surface of the table shown as 3D content 404.

Although 2D advertisement 424 is shown as a wallpaper-type background in the present example, 2D advertisement 424 can also be depicted as scenery or background that includes images or objects. For instance, the 2D advertisement can include a picture of a beach resort with a poolside bar that has branding and product information displayed on decorative flags hanging from the bar, along with drinking glasses and signage placed on the counter of the bar that also includes the branding and product information. This poolside bar advertisement would provide context for the table featured as 3D content 404. Accordingly, the 3D content 404 could be viewed in any number of surroundings with branding and product information integrated.

Figure 5:
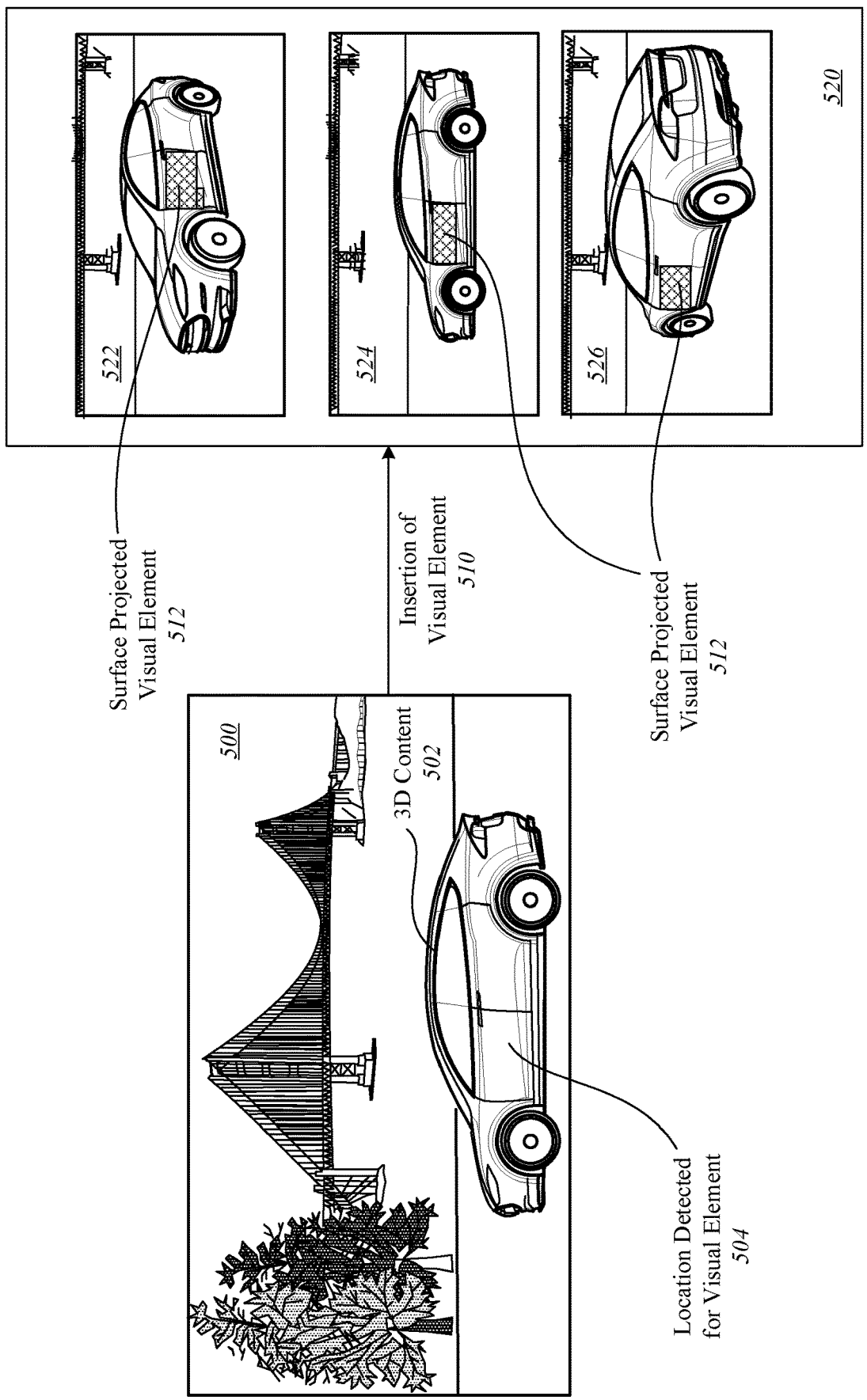
FIG. 5 illustrates one example of a surface projected visual element added to an MVIDMR object.

With reference to FIG. 5, shown is one example of a surface projected visual element added to an MVIDMR object. As shown, a particular view 500 from an MVIDMR depicts a car as 3D content 502. The 3D content 502 is shown in front of background scenery in view 500. In this example, the visual element is an advertisement. Although numerous locations for an advertisement may exist within this view 500, one location that is detected for an advertisement is found at 504. In particular, location 504 is a door of the car, which has been chosen as an appropriate location for an advertisement in this MVIDMR.

Once the location 504 is chosen, an appropriate advertisement is then inserted 510 at this location. An MVIDMR 520 is then generated with the advertisement integrated into the MVIDMR. In particular, the surface projected advertisement 512 is shown in numerous views 522, 524, and 526. In the present example, a 2D advertisement has been projected onto the surface of the car's door. This advertisement is integrated into the MVIDMR and 3D content 502 such that the advertisement appears to be part of the car and is navigable in three dimensions by a viewer.

In the present example, the surface projected advertisement 512 covers the door of the car 504 and follows the contours of the door's surface. In some examples, the surface projected advertisement can be semi-transparent, such that it is superimposed over the existing door and shows the color of the car through the advertisement. In other examples, the surface projected advertisement may cover only a portion of the door. In yet other examples, a surface projected advertisement may cover more of the car or may include three-dimensional aspects. In addition, multiple advertisements may be featured in the same MVIDMR as 2D and/or 3D advertisements. Any number or combination of 2D and/or 3D advertisements can be inserted into an MVIDMR, depending on the desires of the advertisers, users, or application/program providers.

Figure 6:
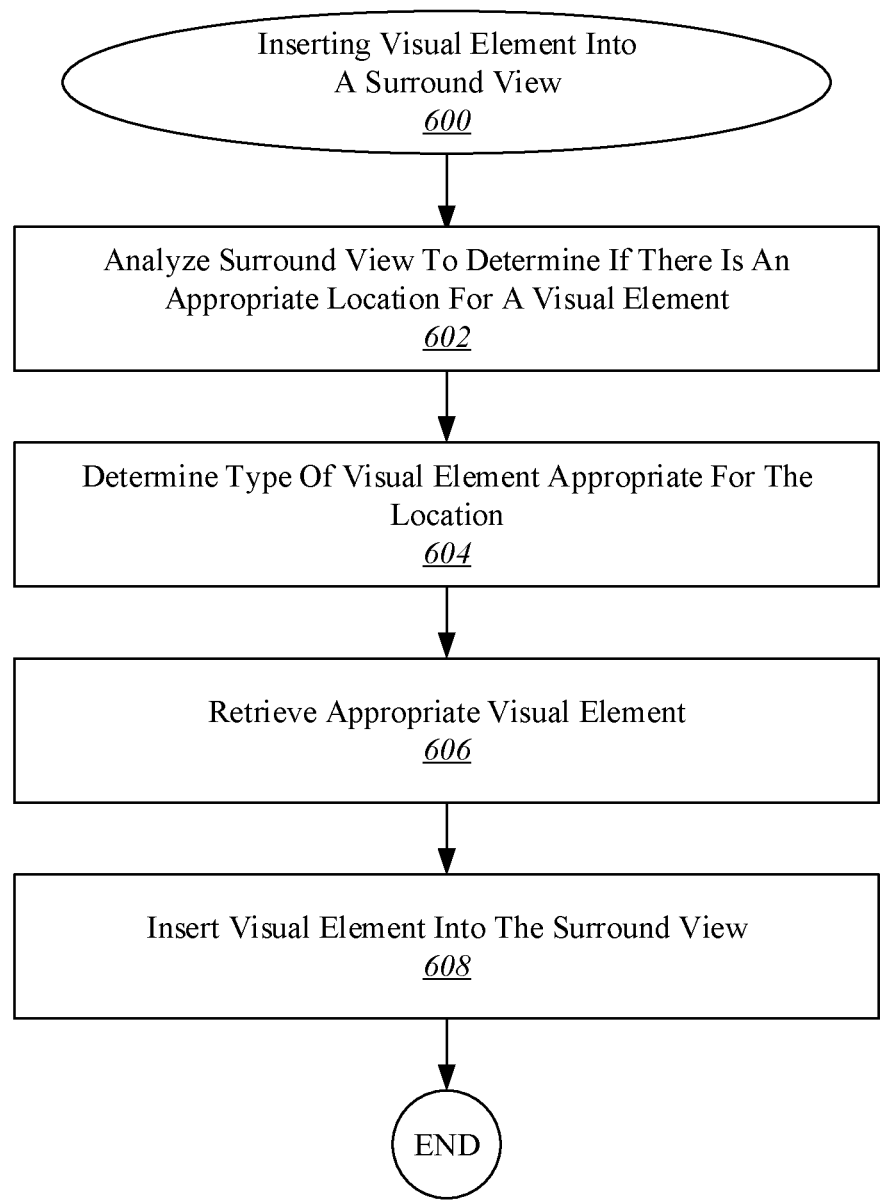
FIG. 6 illustrates an example of a process for inserting a visual element into an MVIDMR.

With reference to FIG. 6, shown is an example of a process for inserting a visual element into an MVIDMR. The process 600 begins by analyzing an MVIDMR to determine if there is an appropriate location for a visual element such as an advertisement at 602. As described previously, the MVIDMR is a multi-view interactive digital media representation that includes multiple views of a scene from different locations that can be navigated in three dimensions on a mobile or other device by a user. Examples of mobile devices include smart phones, tablets, notebooks, etc. Other devices may include computing devices, cameras, etc.

In the present example, the MVIDMR is analyzed to determine if there are one or more locations or regions that would be appropriate for the placement of an advertisement at 602. In particular, appropriate locations or regions on or relative to the content and/or context are identified. The advertisements under consideration may include two-dimensional images and/or three-dimensional objects. The two-dimensional images may include a logo, text, scenery, or other graphics representing a product or sponsoring entity. The three-dimensional objects may include a product to be advertised or branding information displayed on a product or other object. The branding information can include a logo, text, or other graphic associated with a product and/or sponsoring entity. Products to be advertised can include goods, services, media, etc. For instance, products may include movies, food, drinks, music, memorabilia, a media personality, a service provider, etc. In some embodiments, the locations or regions appropriate for placement of an advertisement can be automatically detected when an MVIDMR is generated.

According to particular example embodiments, the content in the MVIDMR is analyzed to determine if 2D and/or 3D advertisements can be placed on or near the content and/or projected onto the content's surface. Specifically, a determination is made whether a 3D advertisement can be placed relative to the content, such as on, in, under, adjacent to, etc. the content. For instance, as described with regard to FIGS. 4A-D, a determination can be made that a 3D advertisement, such as a soda can, can be placed on a table. Furthermore, a determination could also be made that a 3D advertisement, such as a chair, can be placed adjacent to the table (e.g. in front of, to the side of, or behind the table). A determination is also made whether a 2D advertisement can be projected onto the content, an example of which is described with respect to FIG. 5.

In the present embodiment, the context in the MVIDMR is also analyzed to determine if 2D and/or 3D advertisements can be inserted. For instance, a 2D advertisement can be inserted in place of the context or can be added to some aspect of the context. Specifically, the 2D advertisement may cover a portion of the context or may be added as a semi-transparent overlay in some cases. As described previously, a 2D advertisement can sometimes be projected onto a flat or cylindrical context surface, depending on the attributes of the MVIDMR. Additionally, a 3D advertisement can be inserted as context in an MVIDMR in some examples.

In the present example embodiment, once an appropriate location for an advertisement has been identified, a determination is then made about the type of advertisement that would be appropriate for the location at 604. Specifically, a determination is made about whether the appropriate advertisement is a three-dimensional object to be inserted in the MVIDMR or a two-dimensional image to be inserted as or projected onto a background or object in the MVIDMR. The type of advertisement also includes various aspects in addition to whether it is a 2D or 3D advertisement. Specifically, aspects include the size, shape, and subject matter of the advertisement. Additional aspects may include the color, style, and target audience of the advertisement. Accordingly, based on the location of the advertisement selected, a determination is made whether the appropriate advertisement is a 2D or 3D advertisement.

Next, a particular advertisement is selected based on characteristics of the location for the advertisement. For instance, the advertisement may be selected based on aspects such as the size and shape of the location such that an advertisement selected for placement on a table may be different than an advertisement selected for placement on a sofa. Specifically, a soda can may be selected for placement on a table, and a pillow may be selected for placement on a sofa. Similarly, a repetitive wallpaper-type advertisement may be placed on a wall of the MVIDMR, whereas an image-based brand advertisement may be inserted on a smaller plane located in the MVIDMR, such as a picture frame or a computer screen.

According to specific embodiments, an advertisement may be selected based on the content of the advertisement and/or characteristics of the MVIDMR itself. For instance, the content of the advertisement includes aspects such as the kind of product or brand advertised, colors, the intended audience, etc. Consequently, advertisements for beer, diapers, and nail polish would fall under very different types of products/brands advertised and intended audiences. In addition, the colors and style of these advertisements are also likely to differ. When taking into account aspects of the MVIDMR, various characteristics can be inferred from the content and context detected. For instance, if an MVIDMR includes an expensive sports car, an advertisement for wine or beer may be more appropriate than an advertisement for diapers. Similarly, an MVIDMR that includes a children's playground may be a more appropriate place for an applesauce advertisement than a cigarette advertisement. In some embodiments, characteristics associated with the viewer of an MVIDMR may also be considered.

In particular embodiments, an advertisement may be selected based on the visual style of the MVIDMR. For example, advertisements typically placed on professional racecars often have a particular visual style. If the system determines that an MVIDMR includes a sportscar, the system may place a virtual advertisement on the side of the sportscar in a fashion similar to the advertisements placed on professional racecars. Further, the virtual advertisement placed on the sportscar may be presented in a visual style similar to the advertisements typically placed on professional racecars.

Figure 8:
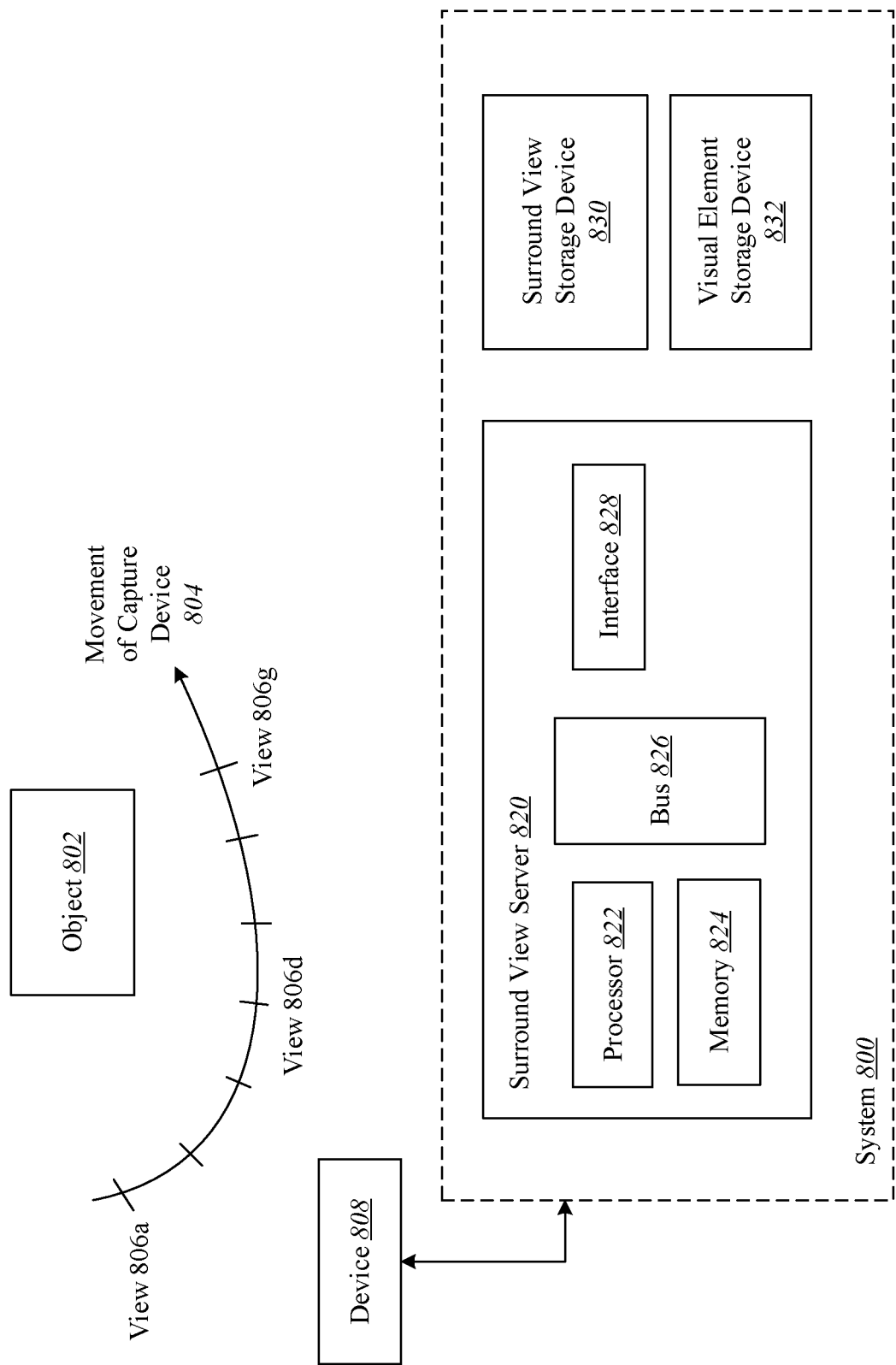
FIG. 8 illustrates a particular example of a system that can be used with various embodiments of the present invention.

Once the type of advertisement is chosen, an appropriate advertisement is retrieved at 606. In particular, an appropriate advertisement with the desired characteristics for the location in the MVIDMR is retrieved from a source such as an advertisement storage device, as shown in FIG. 8. Numerous advertisements can be stored at this location, such that the advertisements can be easily accessed by the system and integrated into MVIDMRs. In addition, some of the advertisements may be customizable, such that colors, sizes, etc. can be modified to fit a particular MVIDMR. According to various examples, each advertisement includes branding information for a product and/or sponsoring entity.

In the present embodiment, the advertisement chosen is then inserted into the MVIDMR at 608. More specifically, the advertisement is integrated into the MVIDMR such that it is navigable by the user. For a 2D advertisement, the text, logos, images, and the like, can be rendered onto a wall, planar surface, or an object's surface within the MVIDMR. For instance, a logo for a soda brand can be rendered onto a wall. For 3D advertisements, the objects can be rendered and/or placed within the MVIDMR relative to the content and/or the context. In one example, a soda can is placed on a table in the MVIDMR.

In particular embodiments, the MVIDMR may be updated to match the style of the selected advertisement. For example, if the advertisement advertises a refreshing drink, then the MVIDMR may be updated to appear icy. As another example, if the advertisement advertises a cleaning product, then the MVIDMR may be updated so that one or more objects appears to be sparkling clean. Such modifications may be made by changing the color values, saturation, or hue, by adding visual effects such as icicles, by removing visual elements such as flames or dirt, or performing other such modifications.

According to various embodiments, the MVIDMR can include various attributes related to its content and context. In some examples, the MVIDMR is based on real-world images captured as photos and/or videos by a user. In other examples, the MVIDMR is constructed in virtual reality, such that the content and context are constructed with the use of software, a computer program, or the like. In yet other examples, the MVIDMR may include augmented reality, with aspects taken from images captured from the real-world and digital images generated with the use of software, a computer program, or the like. As described herein, an advertisement can be inserted into any of these types of MVIDMRs. For instance, the same advertisement can be inserted into a real-world, virtual reality, or augmented reality MVIDMR. In some examples, the advertisement may turn a real-world MVIDMR into an augmented reality MVIDMR, such as when a digitally rendered advertisement, such as a 3D cartoon character with branding information, is inserted into a real-world MVIDMR as if the cartoon character was really there. In that example, the cartoon character would be navigable in three dimensions along with the rest of the MVIDMR.

Although the present example describes adding one advertisement, any number of advertisements can be inserted into an MVIDMR. For instance, when a determination is made about whether there is an appropriate location for an advertisement, multiple locations may be found. In some examples, one of the locations may be chosen, and in other examples, multiple locations may be chosen. The advertisements then selected for these locations can be chosen independently in some cases, such that the advertisements are unrelated in brand and/or product. In other cases, the advertisements may be chosen to promote the same or related brands and/or products.

Figure 7:
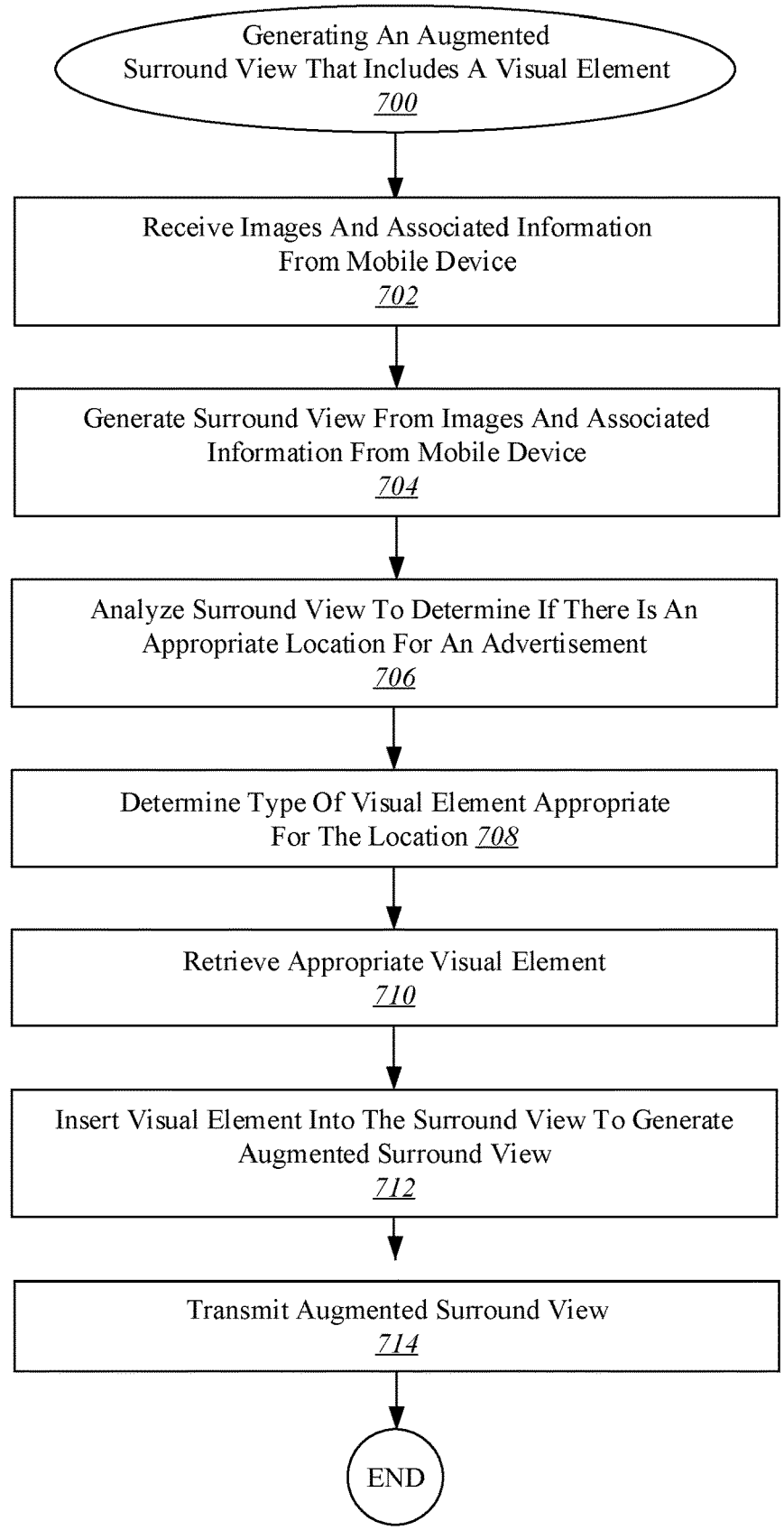
FIG. 7 illustrates an example of process for generating an augmented MVIDMR that includes an added visual element.

With reference to FIG. 7, shown is an example of process for generating an augmented MVIDMR that includes an added visual element. In particular, the process includes inserting an advertisement into an MVIDMR when the MVIDMR is generated. The process is similar to the process described above with regard to FIG. 6, but also includes receiving the initial images used to generate the MVIDMR and providing the augmented MVIDMR to a device, such as a smart phone, tablet, notebook, or other computing device.

In the present embodiment, the process 700 for generating an augmented MVIDMR that includes an advertisement begins when the system receives images and information associated with the information from the mobile device at 702. As described previously, the information associated with the images may include location information, depth information, or the like. Next, an MVIDMR is generated from the images and information received from the capture device at 704. Specifically, the MVIDMR is generated by a process such as the one described above with regard to FIG. 1.

According to various embodiments, the MVIDMR is then analyzed and an advertisement is inserted into the MVIDMR, as described above with regard to FIG. 6. In particular, the MVIDMR is analyzed to determine if there is an appropriate location for an advertisement at 706. Once an appropriate location is found, then a determination is made about a type of advertisement that is appropriate for the location at 708. For instance, the type of advertisement chosen can include a 2D advertisement that includes an image or a 3D advertisement that includes an object that can be integrated into the MVIDMR. Once the type of advertisement is determined, an appropriate advertisement is then retrieved at 710. This advertisement can be retrieved from a storage device, as described in more detail below with regard to FIG. 8. The advertisement is then inserted into the MVIDMR to generate an augmented MVIDMR at 712. In some examples, the advertisement can be added to the MVIDMR as if additional images or information had been received from a user 120 in FIG. 1. The MVIDMR then goes through a process as described above with regard to FIG. 1 to generate an augmented MVIDMR that includes the advertisement in the MVIDMR.

Once the augmented MVIDMR is generated, the augmented MVIDMR is transmitted at 714. In some instances, this may mean transmitting the augmented MVIDMR to a device associated with a user. In other examples, this may mean transmitting the augmented MVIDMR to a storage location from which the device can access the MVIDMR for viewing or downloading.

According to various embodiments, an augmented MVIDMR that includes one or more advertisements may be generated automatically or at the request of a user. For example, advertisements may automatically be added to MVIDMRs unless a user specifies otherwise or if the user pays a fee to not see any advertisements in the MVIDMR. Alternatively, user can be provided with an option to have advertisements integrated into MVIDMRs automatically or have MVIDMRs generated without advertisements if the user pays for the use of the MVIDMR program or application. Additionally, in some implementations, the advertisements can be inserted at the user's request to reduce costs of using the program or application.

In particular examples, a user may actively choose to include advertisements in an MVIDMR. In one scenario, a user may select settings that indicate the type of advertisements that may be added automatically by the system. In another scenario, the user may manually select advertisements to include in an MVIDMR, especially if these advertisements enhance the user's experience of the MVIDMR. Specifically, the user may want to add decorative wallpaper, scenery or products into an MVIDMR for aesthetic reasons that would enhance the MVIDMR. For instance, if a user creates a "selfie" MVIDMR in a plain room (or a messy room), the user may want to instead add surroundings that are more pleasant, such as scenery, wallpaper, objects, etc. Additionally, the advertisements may also be added as filters, frames, or other effects that enhance the user's experience.

In some implementations, a user may be incentivized to provide space for advertisements in an MVIDMR. For example, users may be provided with revenue sharing opportunities for the MVIDMR. The advertiser and the user may then mutually benefit if the MVIDMR is shared with others.

In some examples, a user may have an option to choose the locations and types of advertisements. Specifically, in some implementations, the user can choose from a selection of ads to enhance or decorate the MVIDMR. For instance, the user may choose decorative wallpaper, drinks, pillows, etc. that has branding or product information. Besides promoting a brand or product, the items can be designed to add flair to the MVIDMR. Special effects can also be added, such as 3D bubbles, rain, water, etc. that add different effects to the MVIDMR.

With reference to FIG. 8, shown is a particular example of a system that can be used with various embodiments of the present invention. In particular, system 800 can be used to either generate an MVIDMR that includes one or more visual elements or insert a visual element into an existing MVIDMR. According to particular example embodiments, a system 800 suitable for implementing particular embodiments of the present invention includes an MVIDMR server 820, MVIDMR storage device 830, and advertisement storage device 832.

In the present example, the MVIDMR server 820 communicates with a device 808, such as a smart phone, tablet, notebook, camera, or other computing device. In one example, device 808 is used to capture images of an object or scenery that will be transmitted to system 820 and used to generate an MVIDMR. In another example, device 808 is used to store or transmit an MVIDMR that will be modified by system 800 to include an advertisement.

When device 808 is used to capture images of an object 402 for an MVIDMR, device 808 is moved along a path such as the one depicted as movement of capture device 804 while recording or otherwise capturing images from views 806a to 806g. The views 806a to 806g are captured as images or frames, along with additional information such as location information, spatial information, and scale information corresponding to each of these images or frames. The images and associated information are then transmitted from device 808 to system 800 to be processed into an MVIDMR.

In the present example, system 800 includes an MVIDMR server 820. The MVIDMR server 820 is designed to analyze an MVIDMR to determine if there is an appropriate location to insert an advertisement, determine the type of advertisement that is appropriate for the location, retrieve an advertisement that is appropriate for the location within the MVIDMR, and insert the advertisement into the MVIDMR, such that the advertisement is integrated into the MVIDMR and navigable by the user. As depicted, the MVIDMR server 820 includes processor 822, a memory 824, interface 828, and a bus 826 (e.g., a PCI bus). The interface 828 may include separate input and output interfaces, or may be a unified interface supporting both operations. When acting under the control of appropriate software or firmware, the processor 822 is responsible for such tasks such as optimization. Various specially configured devices can also be used in place of a processor 822 or in addition to processor 822. The complete implementation can also be done in custom hardware. The interface 828 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the server 820 uses memory 824 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

According to various embodiments, system 800 includes an MVIDMR storage device 830 designed to store multiple MVIDMRs that are retrievable and viewable from one or more devices, such as mobile devices, smartphones, computers, or other computing devices. These MVIDMRs can be associated by individual users who have access to their own MVIDMRs or the MVIDMRs can be a repository for MVIDMRs that can be accessed by various users in communication with the system. As described previously, each MVIDMR is a multi-view interactive digital media representation that includes multiple views of a scene from different locations that can be navigated in three dimensions on a mobile device by a user. These MVIDMRs may be generated by MVIDMR server 820 and stored at the MVIDMR storage device 830. In some instances, MVIDMRs generated elsewhere may also be stored at MVIDMR storage device 830, such as when a device 808 transmits a previously generated MVIDMR to system 800.

In the present example embodiment, system 800 also includes a visual element storage device 832, which may include 2D and/or 3D visual elements that are either already rendered and ready to be integrated into an MVIDMR or are ready to be processed into MVIDMRs from raw data that includes images and associated location information, etc. The visual elements may include 2D and 3D advertisements. The 2D advertisements include two-dimensional images and the 3D advertisements include three-dimensional objects that include product and/or branding information. In some examples, different versions of the 2D and/or 3D advertisements can be stored at the advertisement storage device to be used in MVIDMR locations with different characteristics.

Although particular examples have been described with regard to inserting an advertisement into an MVIDMR, the processes and mechanisms described can also be applied to inserting 2D and/or 3D content that does not include advertising or branding information. For instance, a user may wish to augment a particular MVIDMR with additional scenery or elements. Accordingly, the present disclosure is not intended to be limited to providing advertisements as a modification to an MVIDMR. Other modifications, such as insertion of content, is also intended to be included in this disclosure.

Although particular features have been described as part of each example in the present disclosure, any combination of these features or additions of other features are intended to be included within the scope of this disclosure. Accordingly, the embodiments described herein are to be considered as illustrative and not restrictive. Furthermore, although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention.

The invention claimed is:

1. A method comprising:
receiving at a server from a mobile device a first multi-view interactive digital media representation (MVIDMR) including inertial measurement unit (IMU) data and a plurality of two-dimensional images of an object and background scenery captured from different viewpoints along a path of the mobile device through space along an arc that is concave with respect to the object, the plurality of two-dimensional images linked using IMU data and being navigable in one or more dimensions, the IMU data and content-weighted keypoint tracks used to apply view interpolation to the MVIDMR;
determining via a processor at the server a designated location within the first MVIDMR at which to insert a visual element;

generating via the processor a second MVIDMR navigable in one or more dimensions by inserting the visual element into one or more of the plurality of two-dimensional images; and transmitting the second MVIDMR to the mobile device.

2. The method recited in claim 1, wherein the inertial measurement unit includes an accelerometer, and wherein the inertial data includes accelerometer data.

3. The method recited in claim 1, wherein the inertial measurement unit includes a gyroscope, and wherein the inertial data includes gyroscopic data.

4. The method recited in claim 1, wherein the plurality of two-dimensional images are linked at least in part based on the inertial data.

5. The method recited in claim 1, wherein the plurality of two-dimensional images are linked at least in part based on their content.

6. The method recited in claim 5, wherein linking the plurality of two-dimensional images based on their content comprises modeling the object in three dimensions.

7. The method recited in claim 5, wherein linking the plurality of two-dimensional images based on their content comprises modeling the background scenery in two dimensions.

8. The method recited in claim 1, wherein determining the designated location comprises constructing a three-dimensional representation of the object at the server based on the first MVIDMR.

9. The method recited in claim 8, the method further comprising:
identifying the visual element based on the three-dimensional representation of the object.

10. The method recited in claim 9, wherein analyzing the MVIDMR to identify the visual element comprises:
determining a type of visual element that is appropriate for the designated location.

11. The method recited in claim 9, wherein analyzing the MVIDMR to identify the visual element comprises:
determining a type of visual element that is appropriate for the object.

12. The method recited in claim 8, wherein inserting the visual element comprises:
projecting the visual element onto the three-dimensional representation.

13. The method recited in claim 1, wherein the visual element is selected from the group consisting of: a three-dimensional representation, a video, and a two-dimensional image.

14. The method recited in claim 1, wherein inserting the visual element comprises:
projecting the visual element onto a surface.

15. The method recited in claim 1, wherein the arc is a closed loop around the object.

16. One or more non-transitory computer readable media having instructions stored thereon for performing a method, the method comprising:
receiving at a server from a mobile device a first multi-view interactive digital media representation (MVIDMR) including inertial measurement unit (IMU) data and a plurality of two-dimensional images of an object and background scenery captured from different viewpoints along a path of the mobile device through space along an arc that is concave with respect to the object, the plurality of two-dimensional images linked using IMU data and being navigable in one or more dimensions, the IMU data and content-weighted keypoint tracks used to apply view interpolation to the MVIDMR;
determining via a processor at the server a designated location within the first MVIDMR at which to insert a visual element;
generating via the processor a second MVIDMR navigable in one or more dimensions by inserting the visual element into one or more of the plurality of two-dimensional images; and
transmitting the second MVIDMR to the mobile device.

17. The one or more non-transitory computer readable media recited in claim 16, wherein the first MVIDMR includes inertial data captured from an inertial measurement unit at the mobile device, wherein the inertial measurement unit includes an accelerometer and a gyroscope, and wherein the inertial data includes accelerometer data and gyroscopic data, wherein the plurality of two-dimensional images are linked at least in part based on the inertial data and their content on their content, wherein linking the plurality of two-dimensional images based on their content comprises modeling the object in three dimensions and modeling the background scenery in two dimensions, wherein determining the designated location comprises constructing a three-dimensional representation of the object at the server based on the first MVIDMR, the method further comprising identifying the visual element based on the three-dimensional representation of the object at least in part by determining a type of visual element that is appropriate for the designated location and for the object.

18. A system comprising:
a communication interface configured to receive at a server from a mobile device a first multi-view interactive digital media representation (MVIDMR) including a plurality of two-dimensional images of an object and background scenery captured from different viewpoints along a path of the mobile device through space along an arc that is concave with respect to the object, the plurality of two-dimensional images being navigable in one or more dimensions, wherein IMU data and content-weighted keypoint tracks are used to apply view interpolation to the MVIDMR;
a processor configured to determine via a processor at the server a designated location within the first MVIDMR at which to insert a visual element and to generate a second MVIDMR navigable in one or more dimensions by inserting the visual element into one or more of the plurality of two-dimensional images; and
a storage device configured to store the second MVIDMR.

19. The system recited in claim 18, wherein the first MVIDMR includes inertial data captured from an inertial measurement unit at the mobile device, wherein the inertial measurement unit includes an accelerometer and a gyroscope, and wherein the inertial data includes accelerometer data and gyroscopic data, wherein the plurality of two-dimensional images are linked at least in part based on the inertial data on their content, wherein linking the plurality of two-dimensional images based on their content comprises modeling the object in three dimensions and modeling the background scenery in two dimensions, wherein determining the designated location comprises constructing a three-dimensional representation of the object at the server based on the first MVIDMR, and wherein the processor is further configured to identify the visual element based on the three-dimensional representation of the object at least in part by determining a type of visual element that is appropriate for the designated location and for the object.

* * * * *